US012801761B2

(12) United States Patent
Ogasawara et al.

(10) Patent No.: US 12,801,761 B2
(45) Date of Patent: Nov. 17, 2026

(54) INFORMATION PROCESSING APPARATUS, INFORMATION PROCESSING METHOD, CONFIGURATION APPARATUS, AND CONFIGURATION METHOD

(71) Applicant: Mitsubishi Electric Corporation, Tokyo (JP)

(72) Inventors: Katsuhisa Ogasawara, Tokyo (JP); Hiroshi Okuyama, Tokyo (JP); Toshinori Matsui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 95 days.

(21) Appl. No.: 19/100,579

(22) PCT Filed: Aug. 9, 2022

(86) PCT No.: PCT/JP2022/030379

§ 371 (c)(1),
(2) Date: Feb. 3, 2025

(87) PCT Pub. No.: WO2024/034001

PCT Pub. Date: Feb. 15, 2024

(65) Prior Publication Data

US 2026/0037641 A1 Feb. 5, 2026

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC ..................................................... G06F 21/577
See application file for complete search history.

(56) References Cited

U.S. PATENT DOCUMENTS

2011/0035601 A1* 2/2011 Davidson ................ G06F 21/14 713/190
2011/0270963 A1 11/2011 Saito et al.
(Continued)

FOREIGN PATENT DOCUMENTS

JP 2011-028328 A 2/2011
JP 6723955 B2 7/2020
(Continued)

OTHER PUBLICATIONS

Office Action issued Aug. 5, 2025 in Japanese Patent Application No. 2024-540109, 8 pages.
(Continued)

*Primary Examiner* — Ponnoreay Pich
(74) *Attorney, Agent, or Firm* — XSENSUS LLP

(57) ABSTRACT

An information processing apparatus includes computer hardware, system software that manages and controls the computer hardware, and two or more application software items to be executed on the system software. Further, there is an execution-environment separating/setting unit including an execution-environment-separation definition table, a configuration-risk definition table, a configuration-risk evaluation unit, and an activation-setting unit, and an execution-environment separating/deploying unit that deploys execution environments on the computer hardware in accordance with an instruction of the activation-setting unit; the application software items are executed in the respective execution environments deployed by the execution-environment separating/deploying unit.

20 Claims, 23 Drawing Sheets

(56) References Cited

U.S. PATENT DOCUMENTS

| | | | | |
|---|---|---|---|---|
| 2011/0289294 | A1 | 11/2011 | Maeda et al. | |
| 2012/0072968 | A1 * | 3/2012 | Wysopal | G06F 11/3612 726/1 |
| 2017/0249459 | A1 * | 8/2017 | Permeh | G06N 20/00 |
| 2020/0110873 | A1 | 4/2020 | Rosendahl et al. | |
| 2021/0004469 | A1 * | 1/2021 | Chisnall | G06F 9/45558 |
| 2021/0155270 | A1 | 5/2021 | Morita et al. | |
| 2026/0037641 | A1 * | 2/2026 | Ogasawara | G06F 21/577 |

FOREIGN PATENT DOCUMENTS

| | | | |
|---|---|---|---|
| WO | 2011/018827 | A1 | 2/2011 |
| WO | 2011/074168 | A1 | 6/2011 |

OTHER PUBLICATIONS

International Search Report and Written Opinion mailed on Sep. 20, 2022, received for PCT Application PCT/JP2022/030379, filed on Aug. 9, 2022, 11 pages including English Translation.

* cited by examiner

FIG.7

1130

| IDENTIFIER (2000) | EXECUTION ENVIRONMENT NAME (2001) | SPACE SEPARATION SETTING (2002) | EXECUTION-ENVIRONMENT FILE SYSTEM SETTING (2003) | SYSTEM-CALL PERMISSION LIST (2004) |
|---|---|---|---|---|
| C0 | EXTERNAL-CONNECTION EXECUTION ENVIRONMENT | PROCESS ID,<br>USER/GROUP ID,<br>MOUNT POINT,<br>INTER-PROCESS COMMUNICATION,<br>HOST NAME/DOMAIN NAME | rootfs: rootfs_C0,<br>share: [<br>[ /tmp/C0, UID_GID_C0, 0550 ]] | SYS_0004,<br>SYS_0013,<br>... |
| C1 | APPLICATION EXECUTION ENVIRONMENT | PROCESS ID,<br>USER/GROUP ID,<br>MOUNT POINT,<br>INTER-PROCESS COMMUNICATION,<br>HOST NAME/DOMAIN NAME,<br>NETWORK | rootfs: rootfs_C1,<br>share: [ ] | SYS_0013,<br>SYS_0120,<br>... |
| C2 | LOGGING-FUNCTION EXECUTION ENVIRONMENT | PROCESS ID,<br>USER/GROUP ID,<br>MOUNT POINT,<br>INTER-PROCESS COMMUNICATION,<br>HOST NAME/DOMAIN NAME | rootfs: rootfs_C2,<br>share: [ ] | SYS_0004,<br>SYS_0045,<br>... |
| C3 | SYSTEM-SETTING-CONTROL EXECUTION ENVIRONMENT | PROCESS ID,<br>INTER-PROCESS COMMUNICATION,<br>HOST NAME/DOMAIN NAME | rootfs: rootfs_C3,<br>share: [<br>[ /tmp/C0, UID_GID_C3, 0755 ],<br>[ /sc/config, UID_GID_C3, 0755 ],<br>... ] | SYS_0022,<br>SYS_0384,<br>... |
| ... | ... | | | |

FIG.8

1130

2000 2005 2006 2007 2008

| IDENTIFIER | SYSTEM-FUNCTION PERMISSION LIST | RESOURCE-ALLOCATION SETTING | DEVICE-ACCESS-CONTROL SETTING | ACTIVATION START SEQUENCE |
|---|---|---|---|---|
| C0 | CAP_0033,<br>CAP_0058,<br>··· | CALCULATION-CORE-TIME ALLOCATION:<br>[ quota_C0[μs],period_C0[μs]],<br>CALCULATION-CORE MAXIMUM-UTILIZATION-RATE ALLOCATION:<br>usage_C0[%],<br>CALCULATION-CORE ALLOCATION:[core2,core3],<br>MEMORY MAXIMUM ALLOCATION:limit_mem_C0[Bytes/s],<br>COMMUNICATION MAXIMUM<br>BANDWIDTH ALLOCATION:limit_bw_C0[Bytes/s],<br>BLOCK IO MAXIMUM BANDWIDTH ALLOCATION:<br>limit_block_C0[Bytes/s],<br>MAXIMUM PROCESS NUMBER:PIDS_C0 | { NONVOLATILE STORAGE APPARATUS, Read },<br>{ COMMUNICATION APPARATUS, SendRecv },<br>··· | 3 |
| C1 | CAP_0033,<br>CAP_0058,<br>··· | ··· | ··· | N |
| C2 | CAP_0033,<br>CAP_0058,<br>··· | ··· | { NONVOLATILE STORAGE APPARATUS, ReadWrite },<br>··· | 2 |
| C3 | CAP_0033,<br>CAP_0058,<br>··· | ··· | { NONVOLATILE STORAGE APPARATUS, ReadWrite },<br>{ COMMUNICATION APPARATUS, SendRecvCtrl },<br>{SECURITY MODULE APPARATUS, All },<br>{FIFI_C3, ReadWrite },<br>{Socket_C3, ReadWrite },<br>··· | 1 |
| | | | | |

FIG.9

1140

| LOGGING FUNCTION NAME (3000) | LOGGING-BUFFER SETTING (3001) | LOGGING-BUFFER ACCESS FUNCTION (3002) | LOGGING-FILE SETTING (3003) |
| --- | --- | --- | --- |
| C2: AUDIT LOGGING FUNCTION | WRITE-ONCE CIRCULAR BUFFER_0_0, size_0_0 | EXTERNAL-CONNECTION ENVIRONMENT: Firewall | /path/logfile_0_0 |
| | WRITE-ONCE CIRCULAR BUFFER_0_1, size_0_1 | EXTERNAL-CONNECTION ENVIRONMENT: Proxy | /path/logfile_0_1 |
| | WRITE-ONCE CIRCULAR BUFFER_0_2, size_0_2 | EXTERNAL-CONNECTION ENVIRONMENT: INTRUSION DETECTION | /path/logfile_0_2 |
| | ... | | ... |
| C2: APPLICATION LOGGING FUNCTION | WRITE-ONCE CIRCULAR BUFFER_1_0, size_1_0 | APPLICATION EXECUTION ENVIRONMENT: APPLICATION 0 | /path/logfile_1_0 |
| | ... | | ... |
| ... | | | |

FIG.10

1150

4000 4001 4002

| RISK IDENTIFIER | RISK DEFINITION | RISK VALUE |
|---|---|---|
| R0 | EXECUTION ENVIRONMENT: EXTERNAL-CONNECTION EXECUTION ENVIRONMENT,<br>SEPARATION DEFINITION: {<br>DEVICE-ACCESS-CONTROL SETTING: [NONVOLATILE STORAGE APPARATUS, ReadWrite ], SETTING: EXISTING<br>} | RV0 |
| R1 | EXECUTION ENVIRONMENT: EXTERNAL-CONNECTION EXECUTION ENVIRONMENT,<br>SEPARATION DEFINITION: {<br>SPACE SEPARATION: [ PROCESS ID, MOUNT POINT ], SETTING: NOT EXISTING<br>} | RV1 |
| R2 | EXECUTION ENVIRONMENT: EXTERNAL-CONNECTION EXECUTION ENVIRONMENT,<br>SEPARATION DEFINITION: {<br>SYSTEM-CALL PERMISSION LIST: [ SYS_0040, ••• ], SETTING: EXISTING<br>} | RV2 |
| R3 | EXECUTION ENVIRONMENT: EXTERNAL-CONNECTION EXECUTION ENVIRONMENT,<br>SEPARATION DEFINITION: {<br>FILE SYSTEM: [/path/logfile_0, Write ], SETTING: EXISTING<br>} | UNACCEPTABLE |
| ••• | ••• | |
| Ri | EXECUTION ENVIRONMENT: APPLICATION EXECUTION ENVIRONMENT,<br>RESOURCE CONTROL: {<br>CPU: [ RELATIVE DISTRIBUTION 60% OR MORE ], CPUs: [ CPU0 ALLOCATION, ALLOCATION CPU NUMBER 2 OR MORE ],<br>Mem: [ ALLOCATION 1GB OR MORE ]<br>},<br>SETTING: EXISTING<br>} | RVi |
| ••• | ••• | |
| Rm | RISK EVALUATION EQUATION: R0 & R2 | RVM |
| Rn | RISK-VALUE SUMMATION: RV_RATE OR MORE | UNACCEPTABLE |
| CONFIGURATION-TIMING EVALUATION: { EVALUATION: ACCEPTABLE, { RISK-VALUE SUMMATION: RV_total, •••}}<br>※ WHEN EVALUATION IS INAPPROPRIATE: { EVALUATION: INAPPROPRIATE, { Unacceptable Rn, ••• }} | | |

4003

FIG.17

9008

SYSTEM-SETTING-CONTROL INSTRUCTION DESCRIPTION

1. UPDATE EXECUTION-ENVIRONMENT-SEPARATION DEFINITION TABLE
2. UPDATE LOGGING-FUNCTION-SETTING DEFINITION TABLE
3. UPDATE CONFIGURATION-RISK DEFINITION TABLE

* * * m. UPDATE NETWORK ROUTING SETTING TO X n. UPDATE NETWORK FILTER SETTING TO Y

* * *

INFORMATION PROCESSING APPARATUS, INFORMATION PROCESSING METHOD, CONFIGURATION APPARATUS, AND CONFIGURATION METHOD

CROSS-REFERENCE TO RELATED APPLICATION

This application is a national stage application, pursuant to 35 U.S.C. § 371, of International Patent Application No. PCT/JP2022/030379, filed Aug. 9, 2022, the entire contents of which are incorporated herein by reference.

TECHNICAL FIELD

The present disclosure relates to an information processing apparatus, an information processing method, a configuration apparatus, and a configuration method.

BACKGROUND ART

As an automatic control system, there exists a case where two or more functions cooperate with one another and are integrated with one another. In addition, there is expected an automatic control system that recognizes its ambient environment, makes an appropriate determination, and performs optimum control. For example, an autonomous driving system for a vehicle includes an autonomous-driving control unit that creates optimum control parameters in accordance with surrounding conditions, and an engine control unit, a brake control unit, and a steering control unit that realize vehicle-engine control, brake control, and steering control, respectively.

When such an autonomous level as represented by the autonomous driving level specified by the Society of Automotive Engineers (SAE) of the United States rises, it is required that an information processing apparatus is connected with external systems and performs collaborative processing. An information processing apparatus included in a high-autonomy automatic control system is connected with diverse information processing apparatuses and the like through a network so that a whole system is configured. In addition, also when a system diagnosis of an information processing apparatus is performed, it is required that the information processing apparatus is connected with external systems and a diagnosis apparatus so as to perform collaborative processing.

In recent years, in the automotive industry, adoption of software updating for a vehicle control apparatus, utilizing an OTA (Over The Air) technology, has been started. An OTA technology denotes transmitting and receiving data by use of wireless communication. In particular, in many cases, data communication for, in a wireless-communication terminal typified by a smartphone, updating an OS (Operating System) for the wireless-communication termina itself or updating set application software is referred to as OTA.

Also in an information processing apparatus included in an automatic control system, it is required to add and update the functions to be provided. Addition and updation of software for an information processing apparatus, utilizing the OTA technology, have been started.

As the level of connection with diverse external systems and a diagnosis apparatus and the level of cooperative processing become higher, the security risk becomes large. In order to decrease the security risk, there exists an information processing apparatus provided with an intrusion detection device. However, security intrusion is carried out, while the intrusion detection is evaded and the security of the function for connection with the outside is attacked. In some cases, because a vulnerable part in the attacking boundary over a whole information processing apparatus is found from an intruded apparatus or an intruded function, as a starting point, and then the weak point is attacked, the information processing apparatus is made abnormal.

With regard to these issues, there has been proposed a technology in which when an abnormality is detected from the information processing apparatus of a vehicle-mounted system, spread prevention processing for the abnormal state is performed. The spread destination is determined in accordance with the abnormality occurrence point and the abnormal state and then the driving mode is changed to a usable mode, so that the vehicle can travel continuously (e.g., Patent Document 1).

CITATION LIST

Patent Literature

Patent Document 1: Japanese Patent No. 6723955

SUMMARY OF INVENTION

Technical Problem

In the technology disclosed in Patent Document 1, against the security attack on the vehicle information processing apparatus, the candidate of the spread destination of the abnormal state is calculated in accordance with the abnormal point and the abnormal state. In accordance with the calculated spread-destination candidate, a specific driving mode is selected in order to eliminate the effect to the driving state, then the present driving mode is transferred to the specific driving mode. Accordingly, the vehicle can continuously travel.

However, the technology disclosed in Patent Document 1 is neither the one that reduces the risk of security intrusion against the attack from the outside nor the one that narrows the range of the security intrusion so as to harden the system; moreover, the technology disclosed in Patent Document 1 does not refer to the methods therefor. The present disclosure has been implemented in consideration of the foregoing problems.

The objective of the present disclosure is to obtain an information processing apparatus and an information processing method that each reduce the security-intrusion risk caused by a security attack and raise the defensiveness. In addition, the objective of the present disclosure is to narrow the range of the security intrusion so as to harden the information processing apparatus and the information processing apparatus.

The objective of the present disclosure is to obtain a configuration apparatus and a configuration method that each change and update the configuration of software items for an information processing apparatus, while reducing the security-intrusion risk caused by a security attack and raising the defensiveness. Moreover, the objective of the present disclosure is to obtain a configuration apparatus and a configuration method that each change and update the configuration of software items for a hardened information processing apparatus, while narrowing the range of security intrusion.

Solution to Problem

An information processing apparatus according to the present disclosure includes computer hardware, system software that manages and controls the computer hardware, two or more application software items to be executed on the system software, an execution-environment separating/setting unit comprising an execution-environment-separation definition table where setting items of respective execution environments in which the application software items are executed are defined, a configuration-risk definition table where a risk of being intruded from the outside is defined for each of the execution environments, a configuration-risk evaluation unit that calculates a risk value for each of the execution environments, based on the configuration-risk definition table, and, an activation-setting unit that performs setting and activation processing of the respective execution environments for the application software items, and an execution-environment separating/deploying unit that deploys the execution environment on the computer hardware, in accordance with an instruction of the activation-setting unit and based on setting of the execution environment defined by the execution-environment-separation definition table; the application software items are executed in the respective execution environments deployed by the execution-environment separating/deploying unit.

An information processing method, for the information processing apparatus, according to the present disclosure includes a first step where the activation-setting unit obtains a configuration-timing evaluation indicating whether or not a risk in the information processing apparatus is acceptable, based on the configuration-risk definition table, a second step where when the configuration-timing evaluation is "acceptable", the activation-setting unit starts activation processing of the execution environment for each of the execution environments defined in the execution-environment-separation definition table and when the configuration-timing evaluation is "inappropriate", the processing by the activation-setting unit is ended, a third step where the activation-setting unit waits for whether or not a result of activation processing of the execution environment for each of the execution environments is good, and a fourth step where when the result of activation processing of the execution environment is good and there exists the execution environment, among the execution environments defined in the execution-environment-separation definition table, to which activation processing has not been applied, the activation-setting unit starts activation processing of said execution environment and then advances to the third step, when the result of activation processing is good and there exists none of the execution environments to each of which activation processing has not been applied, the activation-setting unit ends the processing, and when the result of activation processing is bad, the activation-setting unit ends all the execution environments to each of which activation processing has been applied.

A configuration apparatus, to be connected with the information processing apparatus, according to the present disclosure includes an HMI having an input unit and a display unit, an execution-environment-separation definition table for transmission, a logging-function-setting definition table for transmission, a configuration-risk definition table for transmission, a configuration-risk evaluation unit for transmission, a system-setting-control instruction description in which there is described processing to be executed by the system-setting-control processing unit in the system-setting-control execution environment provided in the information processing apparatus, an authentication/secure access unit for transmission that performs authentication processing and secure communication processing between itself and the system-setting-control execution environment provided in the information processing apparatus, and a deployment unit that transmits, to the system-setting-control execution environment of the information processing apparatus, information including the execution-environment-separation definition table for transmission, the logging-function-setting definition table for transmission, the configuration-risk definition table for transmission, and the system-setting-control instruction description.

A configuration method, for the configuration apparatus, according to the present disclosure includes a first step where the deployment unit makes the configuration-risk evaluation unit for transmission calculate a risk value based on a configuration-risk definition table for transmission, a second step where the deployment unit obtains a configuration-timing evaluation in the configuration-risk definition table for transmission, a third step where in the case where the configuration-timing evaluation is acceptable, the deployment unit configures a secure interconnection path between the authentication/secure access unit for transmission of the configuration apparatus and the authentication/secure access unit of the information processing apparatus, and a fourth step where the deployment unit that transmits, to the information processing apparatus, data including the execution-environment-separation definition table for transmission, the logging-function-setting definition table for transmission, the configuration-risk definition table for transmission, and the system-setting-control instruction description.

Advantageous Effects of Invention

The information processing apparatus and the information processing method according to the present disclosure make it possible that the security-intrusion risk caused by a security attack is reduced and that the defensiveness is raised. Moreover, the range of security intrusion can be narrowed, so that the information processing apparatus can be hardened.

The configuration apparatus and the configuration method according to the present disclosure make it possible that the configuration of software of the information processing apparatus is changed and updated, while the security-intrusion risk caused by a security attack is reduced so as to raise the defensiveness. Moreover, it is made possible that the configuration of software of the information processing apparatus is changed and updated, while the range of the security intrusion is narrowed so as to harden the information processing apparatus.

BRIEF DESCRIPTION OF DRAWINGS

FIG. 7 is a first drawing representing an execution-environment-separation definition table for the information processing apparatus according to Embodiment 1;

FIG. 8 is a second drawing representing an execution-environment-separation definition table for the information processing apparatus according to Embodiment 1;

FIG. 9 is a drawing representing a logging-function-setting definition table for the information processing apparatus according to Embodiment 1;

FIG. 10 is a drawing representing a configuration-risk definition table for the information processing apparatus according to Embodiment 1;

FIG. 17 is a drawing representing system-setting-control instruction description of the configuration apparatus according to Embodiment 1;

DESCRIPTION OF EMBODIMENTS

Hereinafter, the information processing apparatus, the information processing method, and the configuration method according to each of the embodiments of the present disclosure will be explained with reference to the drawings.

1. Embodiment 1

<Configuration of Information Processing Apparatus>

Figure 1:
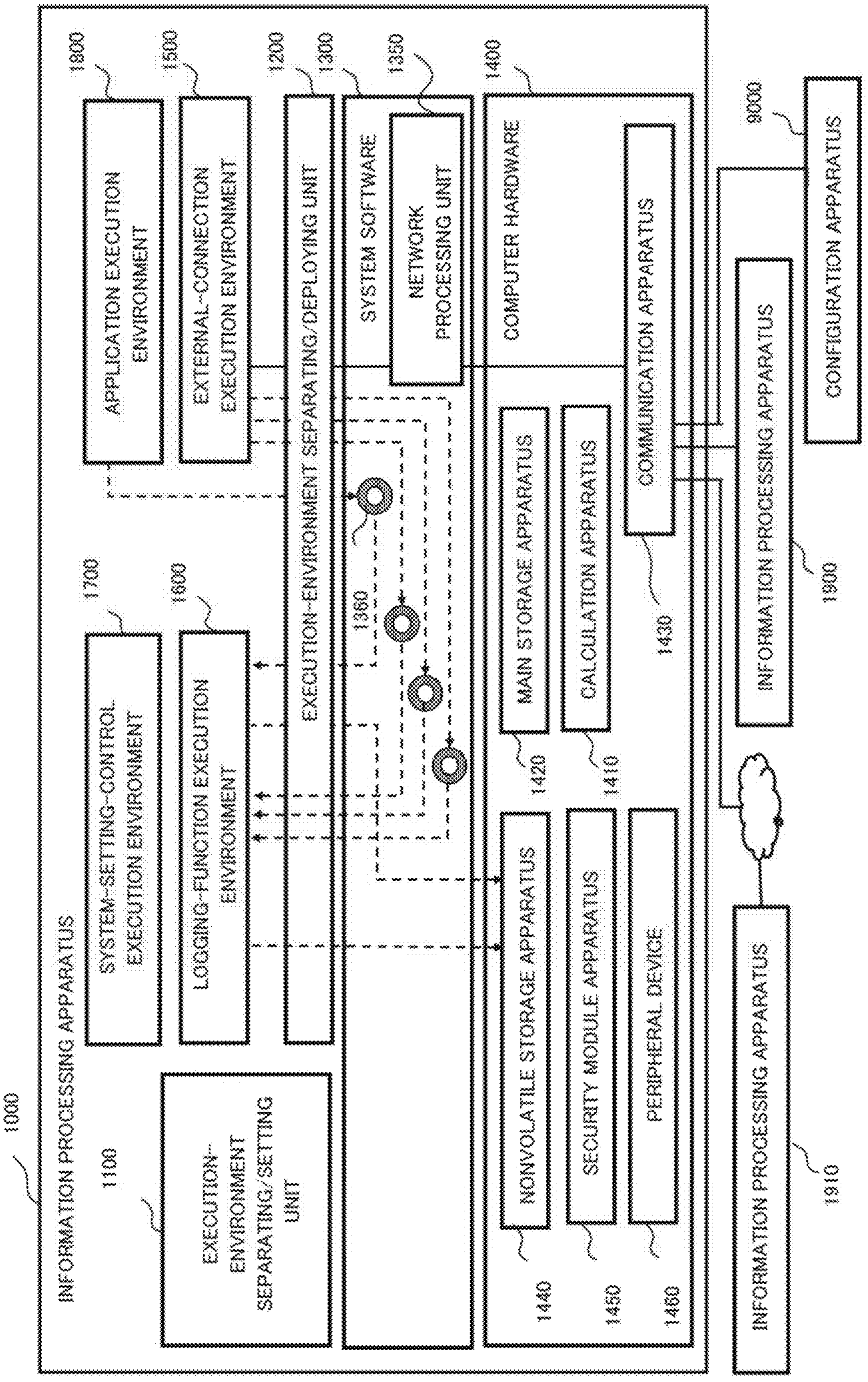
FIG. 1 is a block diagram representing the configuration of an information processing apparatus according to Embodiment 1.

FIG. 1 is a block diagram representing the configuration of an information processing apparatus 1000 according to Embodiment 1. The information processing apparatus 1000 includes at least an execution-environment separating/setting unit 1100, an execution-environment separating/deploying unit 1200, system software 1300, and computer hardware 1400.

The system software is software for performing basic control and management of the computer hardware 1400. The system software items include firmware, an OS, middleware, and the combination thereof; alternatively, the system software is a generic name of each thereof. The system software exists as an infrastructure in which application software that performs a specific task is executed.

The execution-environment separating/setting unit 1100 has setting information related to separating/setting of execution environments to be configured on the system software 1300. The execution environment is an environment where application software is executed. In the case where application software is actually executed, software is deployed on a main storage apparatus 1420 of the computer hardware 1400, hardware resources such as a calculation apparatus 1410, a peripheral device 1460, and a communication apparatus 1430 are utilized, and the function to be provided by the system software 1300 and the like are further utilized, so that an execution environment is deployed in an executable manner.

In FIG. 1, as the execution environments, an external-connection execution environment 1500, a logging-function execution environment 1600, a system-setting-control execution environment 1700, and an application execution environment 1800 are exemplarily represented. These execution environments are deployed by the execution-environment separating/setting unit 1100 and through the execution-environment separating/deploying unit 1200. In this situation, the execution-environment separating/deploying unit 1200 can separate the execution environments from one another, for example, by logically separating the execution environments for application software items and then deploying them on the separated addresses in the main storage apparatus 1420, by deploying cache memories at a calculation time on separated addresses, and by utilizing different calculation apparatuses 1410 or utilizing the calculation apparatus 1410 at separated timing. Through the foregoing method, the security-intrusion risk caused by a security attack from the outside can be reduced, so that the defensiveness can be raised. Moreover, the range of security intrusion can be narrowed, so that the information processing apparatus can be hardened.

The network processing unit 1350 of the system software 1300 performs transmission and reception of communication data between itself and external information processing apparatuses 1900 and 1910 and a configuration apparatus 9000 that are connected with the information processing apparatus 1000 and performs basic communication protocol processing of the transmitted and received communication data. The communication with the external information processing apparatus 1910 can also be realized through cloud computing.

<Computer Hardware>

The computer hardware 1400 includes at least the calculation apparatus 1410, the main storage apparatus 1420, the communication apparatus 1430, a nonvolatile storage apparatus 1440, a security module apparatus 1450, and the peripheral device 1460. The calculation apparatus 1410 has at least one or more calculation cores that perform calculation processing. For the functional programs that operate in the execution environments 1500 through 1800 and the functional programs included in the execution-environment separating/setting unit 1100, the system software 1300 performs deployment control of the calculation cores of the calculation apparatus 1410.

The main storage apparatus 1420 stores data for performing calculation processing. The main storage apparatus 1420 also supports data in a buffer that functions as a write-once circular buffer 1360 on the system software 1300. For the functional programs that operate in the respective execution environments and the functional programs included in the execution-environment separating/setting unit 1100, the system software 1300 performs deployment control of the storage areas of the main storage apparatus 1420.

The communication apparatus 1430 communicates with the information processing apparatuses 1900 and 1910 and the configuration apparatus 9000 so as to perform transmission and reception of data between itself and them. For the functional programs that operate in the execution environments and the functional programs included in the execution-environment separating/setting unit 1100, the system software 1300 performs deployment control of the QoS (Quality of Service) control items and the communication bandwidths of the calculation apparatus 1430.

The nonvolatile storage apparatus 1440 permanently holds recorded data. For the functional programs that operate in the execution environments and the functional programs included in the execution-environment separating/setting unit 1100, the system software 1300 performs deployment control of the storage areas of the main storage apparatus 1440.

The security module apparatus 1450 performs at least management of a key to be utilized for encryption or an electronic signature, creation of random numbers, and encryption processing. In a secure boot of the information processing apparatus 1000, the security module apparatus 1450 can be adopted as a reliable starting point. The secure boot denotes a mechanism in which a device is started after verifying that the OS and application software are not tampered with.

Adoption of the security module apparatus 1450, as the reliable starting point, makes it possible to start up, with secured safety, the system software 1300, the execution-environment separating/setting unit 1100, the execution-environment separating/deploying unit 1200, and one or more foregoing execution environments. For the functional programs that operate in the execution environments and the functional programs included in the execution-environment separating/setting unit 1100, the system software 1300 performs deployment control of the security module apparatus 1450.

The peripheral device 1460 is a peripheral device provided in the computer hardware 1400. For the functional programs that operate in the execution environments and the functional programs included in the execution-environment separating/setting unit 1100, the system software 1300 performs deployment control of the peripheral device 1460.

<Hardware Configuration Concepts of Information Processing Apparatus and Configuration Apparatus>

Figure 2:
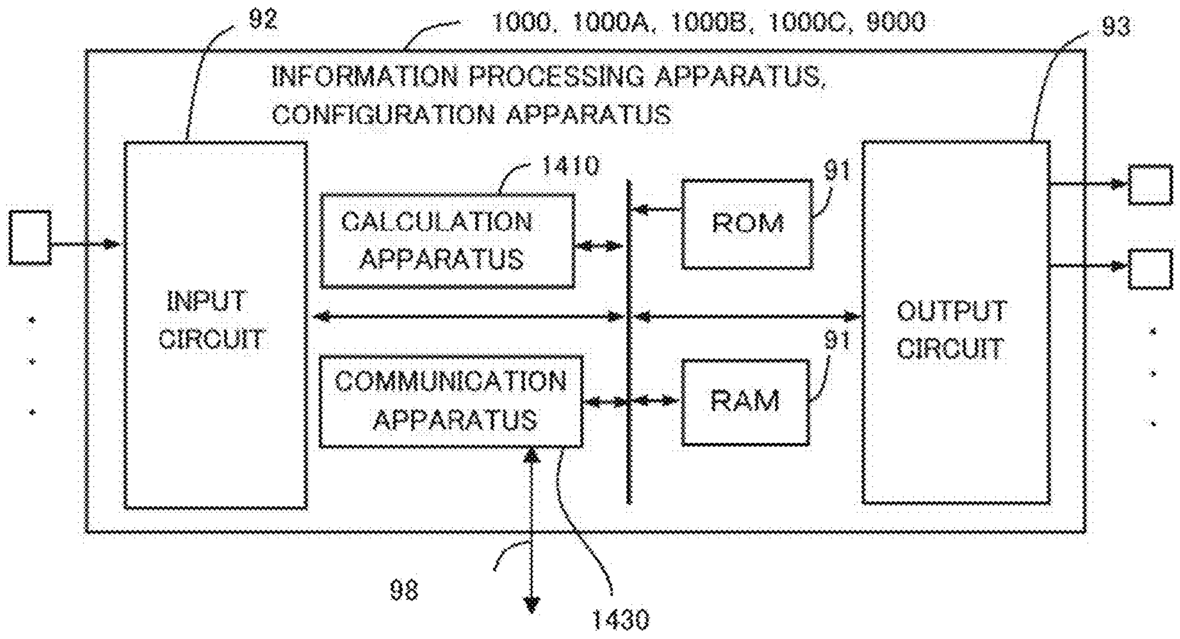
FIG. 2 is a hardware-configuration conceptual diagram of the information processing apparatus or a configuration apparatus according to Embodiment 1.

FIG. 2 is a hardware-configuration conceptual diagram that can be applied to each of the information processing apparatus 1000, information processing apparatuses 1000A, 1000B, and 1000C, and the configuration apparatus 9000 according to Embodiment 1. Hereinafter, as the representative, the information processing apparatus 1000 will be explained. Respective functions of the information processing apparatus 1000 are realized by processing circuits provided in the information processing apparatus 1000. Specifically, as illustrated in FIG. 2, the information processing apparatus 1000 includes, as processing circuits, the calculation apparatus (computer) 1410 such as a CPU (Central Processing Unit), storage apparatuses 91 that exchange data with the calculation apparatus 1410, an input circuit 92 that inputs external signals to the calculation apparatus 1410, an output circuit 93 that outputs signals from the calculation apparatus 1410 to the outside, and an interface, such as the communication unit 1430, that transmits or receives data via a communication path 98. A diagnostic port may be provided as the input circuit 92 or the output circuit 93.

It may be allowed that as the calculation apparatus 1410, an ASIC (Application Specific Integrated Circuit), an IC (Integrated Circuit), a DSP (Digital Signal Processor), an FPGA (Field Programmable Gate Array), any one of various kinds of logic circuits, any one of various kinds of signal processing circuits, or the like is provided. The SOC (System on a Chip) technology may be applied to the calculation apparatus 1410. In addition, it may be allowed that as the calculation apparatus 1410, two or more calculation apparatuses of the same type or different types are provided and respective processing items are executed in a sharing manner. In the information processing apparatus 1000, as the storage apparatuses 91, there are provided a RAM (Random Access Memory) that can read data from and write data in the calculation apparatus 1410, a ROM (Read Only Memory) that can read data from the calculation apparatus 1410, a disk apparatus as a high-capacity storage apparatus, and the like. The storage apparatuses 91 may be incorporated in the calculation apparatus 1410. In FIG. 1, as the main storage apparatus 1420, the nonvolatile storage apparatus 1440, and the like, the storage apparatuses 91 are deployed in accordance with the application.

The input circuit 92 is connected with an input signal, a sensor, and a switch and is provided with an A/D converter and the like for inputting the input signal and signals from the sensor and the switch to the calculation apparatus 1410. The output circuit 93 is connected with electric loads such as a gate driving circuit for on/off-driving switching devices and the like, and is provided with a driving circuit and the like for outputting control signals from the calculation apparatus 1410 to these electric loads. Via the communication path 98, the communication apparatus 1430 can exchange data with an external apparatus such as an external control apparatus.

The calculation apparatus 1410 runs software items (programs) stored in the storage apparatuses 91, such as a RAM, a ROM, and a disk apparatus, and collaborates with other hardware devices in the information processing apparatus 1000, such as the storage apparatuses 91, the input circuit 92, and the output circuit 93, so that the respective functions provided in the information processing apparatus 1000 are realized. In addition, setting data items such as a threshold value and a determination value to be utilized in the information processing apparatus 1000 are stored, as part of software items (programs), in the storage apparatuses 91 such as a RAM, a ROM, and a disk apparatus. It may be allowed that the respective functions included in the information processing apparatus 1000 are configured with either software modules or combinations of software and hardware.

<Execution-Environment Separating/Setting Unit>

Figure 3:
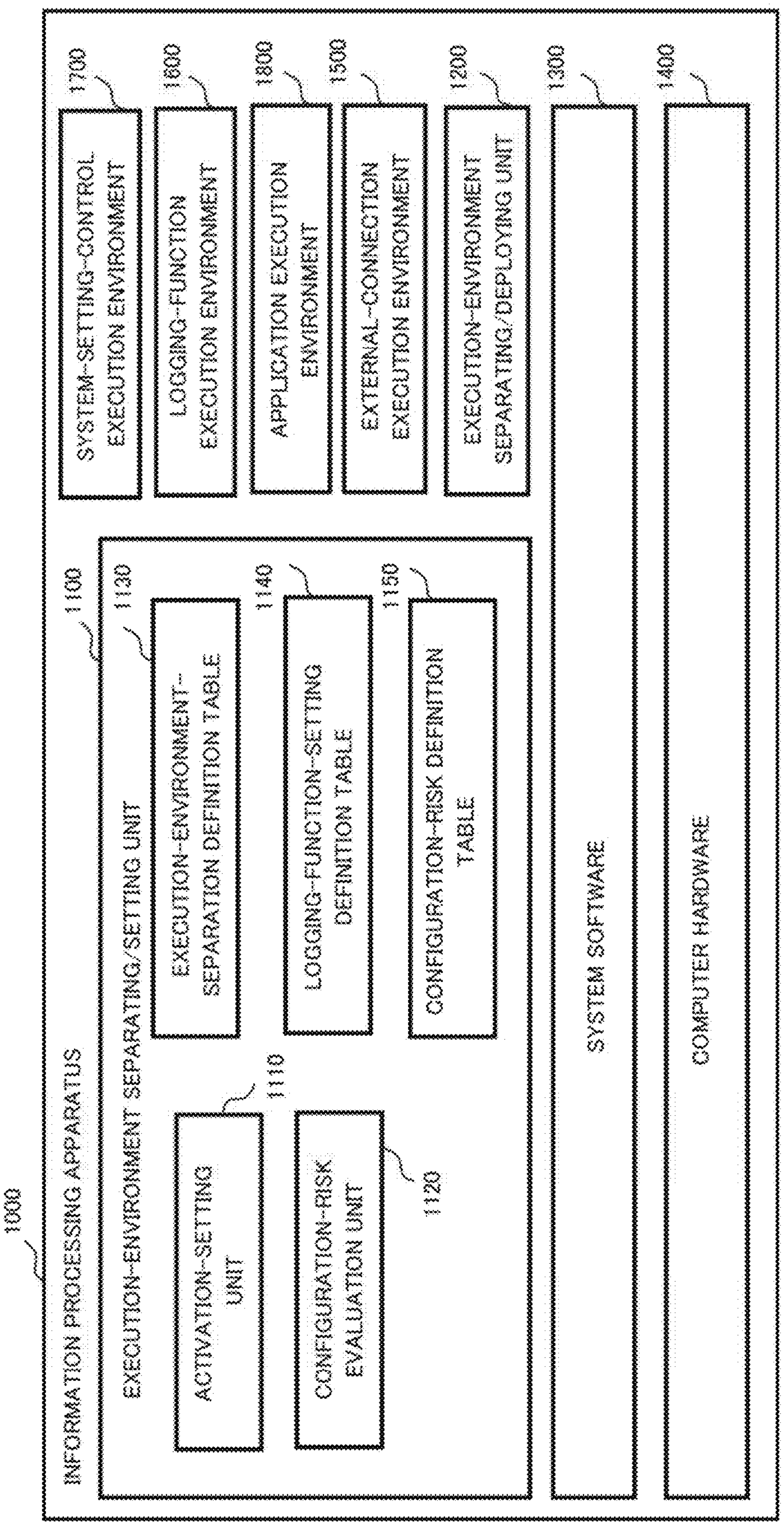
FIG. 3 is a block diagram representing the configuration of an execution-environment separating/setting unit of the information processing apparatus according to Embodiment 1.

FIG. 3 is a block diagram representing the configuration of the execution-environment separating/setting unit 1100 of the information processing apparatus 1000 according to Embodiment 1.

The execution-environment separating/setting unit 1100 has setting information related to separating/setting of execution environments to be configured on the system software 1300 so as to perform start-setting of the execution environments. In response to an instruction from the execution-environment separating/setting unit 1100, the execution-environment separating/deploying unit 1200 performs separating deployment of the execution environments, based on the information in the execution-environment separating/setting unit 1100. As the execution environments, the external-connection execution environment 1500, the logging-function execution environment 1600, the system-setting-control execution environment 1700, and the application execution environment 1800 are exemplarily represented.

The execution-environment separating/setting unit 1100 is provided with an activation-setting unit 1110, a configuration-risk evaluation unit 1120, an execution-environment-separation definition table 1130, a logging-function-setting definition table 1140, and a configuration-risk definition table 1150. Based on a setting description in the execution-environment-separation definition table 1130, the activation-setting unit 1110 performs activation and setting of the execution environments, through the execution-environment separating/deploying unit 1200.

Based on the configuration-risk definition table 1150, the configuration-risk evaluation unit 1120 performs risk evaluation of the system configuration of the information processing apparatus 1000. The execution-environment-separation definition table 1130 describes separation definitions for the execution environments The logging-function-setting definition table 1140 describes a logging-function setting definition for each of logging functions that operate in the logging-function execution environments 1600 to be configured as execution environments. The configuration-risk definition table 1150 describes a security risk in the setting description of the execution-environment-separation definition table 1130.

<System-Setting-Control Execution Environment and Application Execution Environment>

Figure 4:
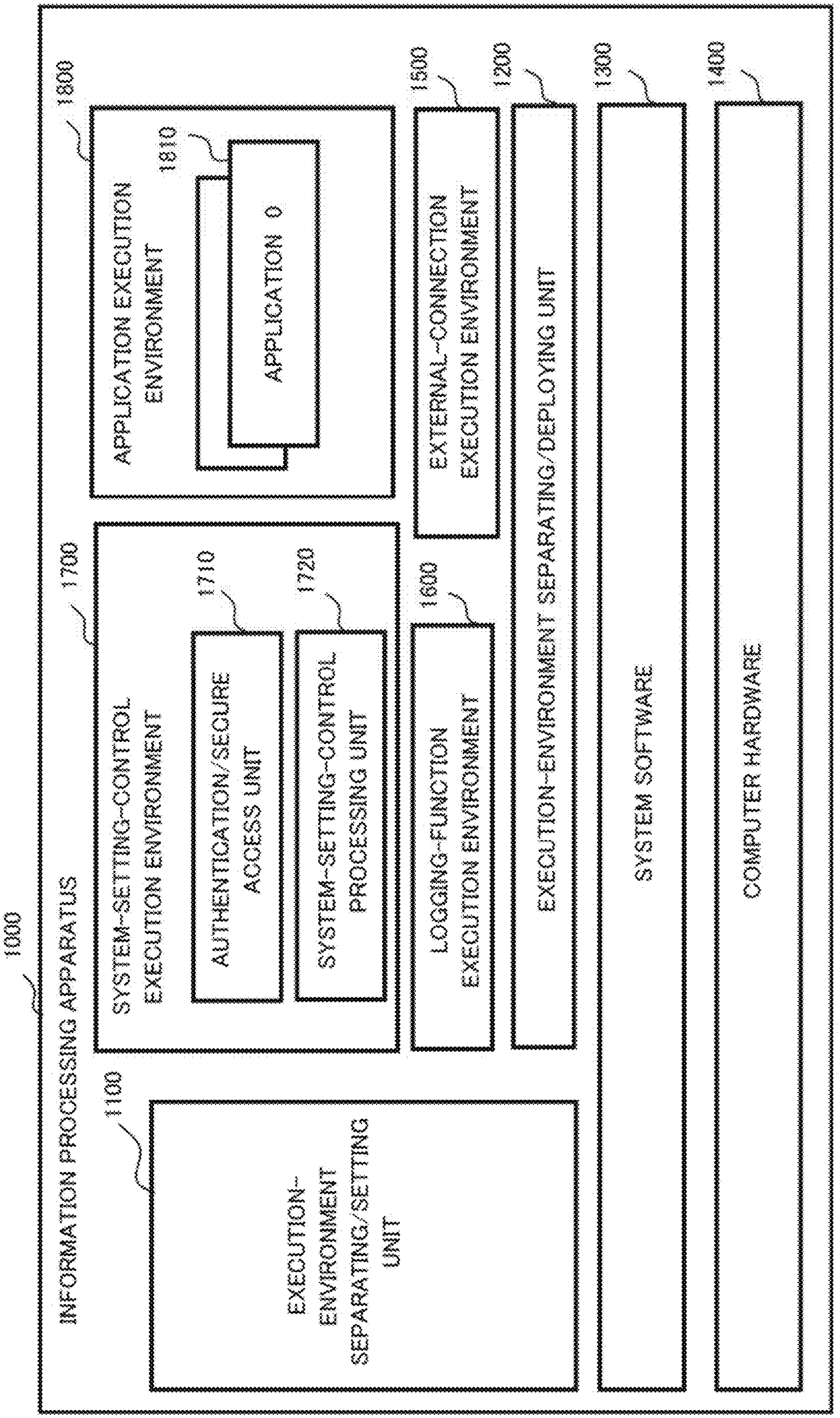
FIG. 4 is a block diagram representing the respective configurations of a system-setting-control execution environment and an application execution environment of the information processing apparatus according to Embodiment 1.

FIG. 4 is a block diagram representing the respective configurations of the system-setting-control execution environment 1700 and the application execution environment 1800 of the information processing apparatus 1000 according to Embodiment 1. The information processing apparatus 1000 is provided with the system-setting-control execution environment 1700 to be configured as an execution environment. The system-setting-control execution environment 1700 has an authentication/secure access unit 1710 and a system-setting-control processing unit 1720.

The authentication/secure access unit 1710 indicates functions required for performing authenticated and secured access in the case where transmitting data to and receiving data from the information processing apparatuses 1900 and 1910 outside the information processing apparatus 1000 are performed. In particular, in the case where change and update of software to be executed by the information processing apparatus 1000 are instructed by the external configuration apparatus 9000, the authenticated and secured access becomes important.

The system-setting-control execution environment 1700 receives an instruction description for system-setting control from the configuration apparatus 9000, and then executes the instruction description. Accordingly, the change and update of the software to be executed by the information processing apparatus 1000 are performed. In addition, the information processing apparatus 9000 may be utilized as a configuration apparatus.

The application execution environment 1800 indicates an execution environment for each application software 1810 that deals with a task to be executed on the system software 1300. It is made possible that the application software 1810 to be executed is selected from two or more application software items and is executed.

<External-Connection Execution Environment and Logging-Function Execution Environment>

Figure 5:
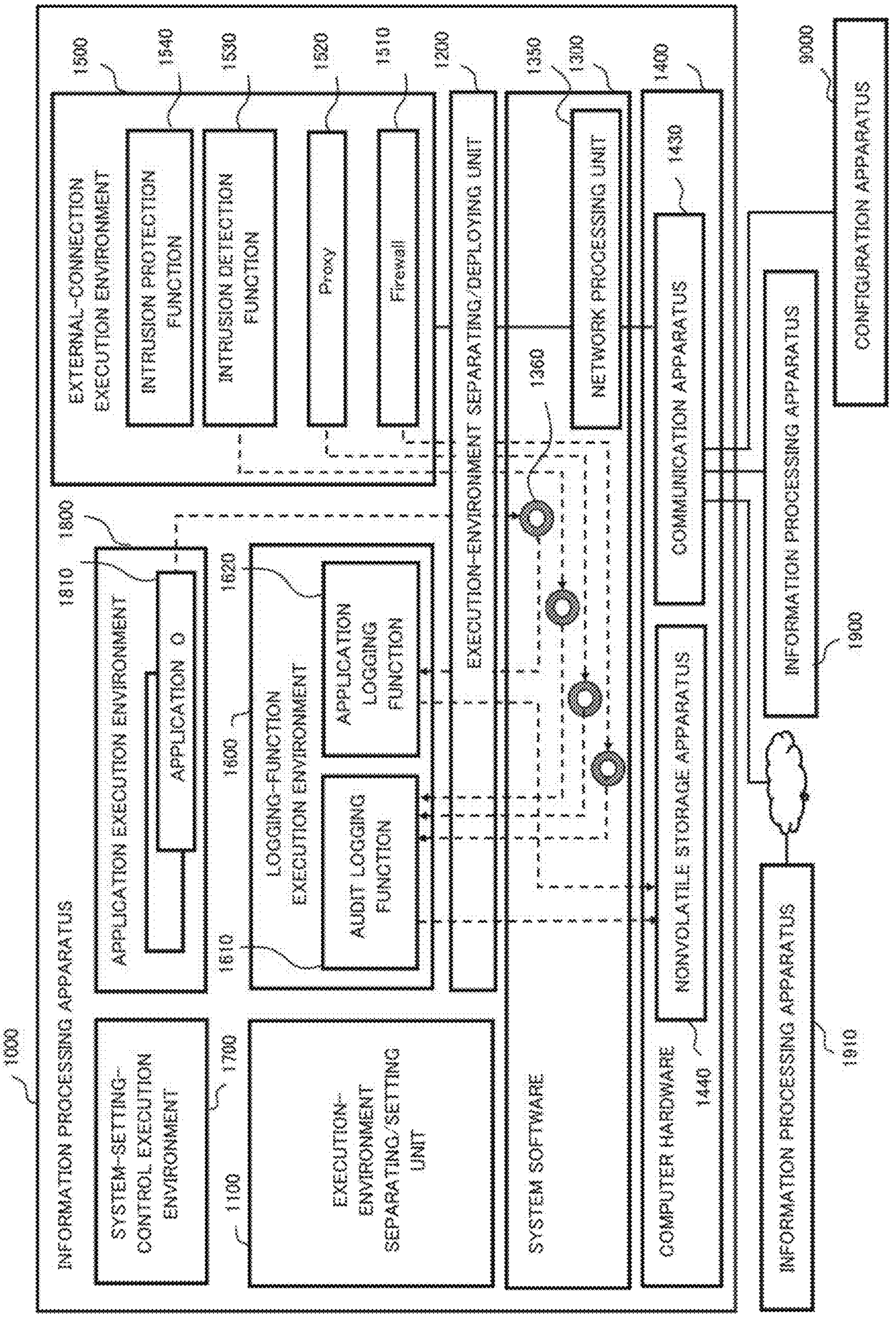
FIG. 5 is a block diagram representing the respective configurations of an external-connection execution environment and a logging-function execution environment of the information processing apparatus according to Embodiment 1.

FIG. 5 is a block diagram representing the respective configurations of the external-connection execution environment 1500 and the logging-function execution environment 1600 of the information processing apparatus 1000 according to Embodiment 1. The information processing apparatus 1000 has the external-connection execution environment 1500 to be configured as an execution environment that is connected with the external information processing apparatuses 1900 and 1910 and the configuration apparatus 9000, through the communication apparatus 1430. The external-connection execution environment 1500 has Firewall 1510, Proxy 1520, an intrusion detection function 1530, and an intrusion protection function 1540, as communication-data processing functions.

The information processing apparatus 1000 has the logging-function execution environment 1600. The logging-function execution environment 1600 has an audit logging function 1610, and an application logging function 1620.

In the external-connection execution environment 1500, each time the processing of Firewall 1510, Proxy 1520, or the intrusion detection function 1530 is performed, additional writing of a log to the write-once circular buffer 1360 is performed. Then, the contents recorded in the write-once circular buffer 1360 are read by the audit logging function 1610 of the logging-function execution environment 1600 and are recorded and stored in the nonvolatile storage apparatus 1440.

In addition, each time the application software 1810 is changed, updated, started, or executed in the application execution environment 1800, additional writing of a log to the write-once circular buffer 1360 is performed. Then, the contents recorded in the write-once circular buffer 1360 are read by the application logging function 1620 1610 of the logging-function execution environment 1620 and are recorded and stored in the nonvolatile storage apparatus 1440.

As described above, additional writing of a log is performed in the write-once circular buffer 1360 in each of the external-connection execution environment 1500 and the application execution environment 1800, so that the log is not erased but securely recorded. Then, the logging-function execution environment 1600 transfers the record in the write-once circular buffer 1360 to the nonvolatile storage apparatus 1440. Thus, the record is stably stored. The record of attacks from the outside to the information processing apparatus can securely be held, so that it is made possible that the record is adapted to the present state grasping and is made use of for the future prediction. Accordingly, the foregoing method can contribute to reducing the security-intrusion risk caused by a security attack and raising the defensiveness.

<System Software>

Figure 6:
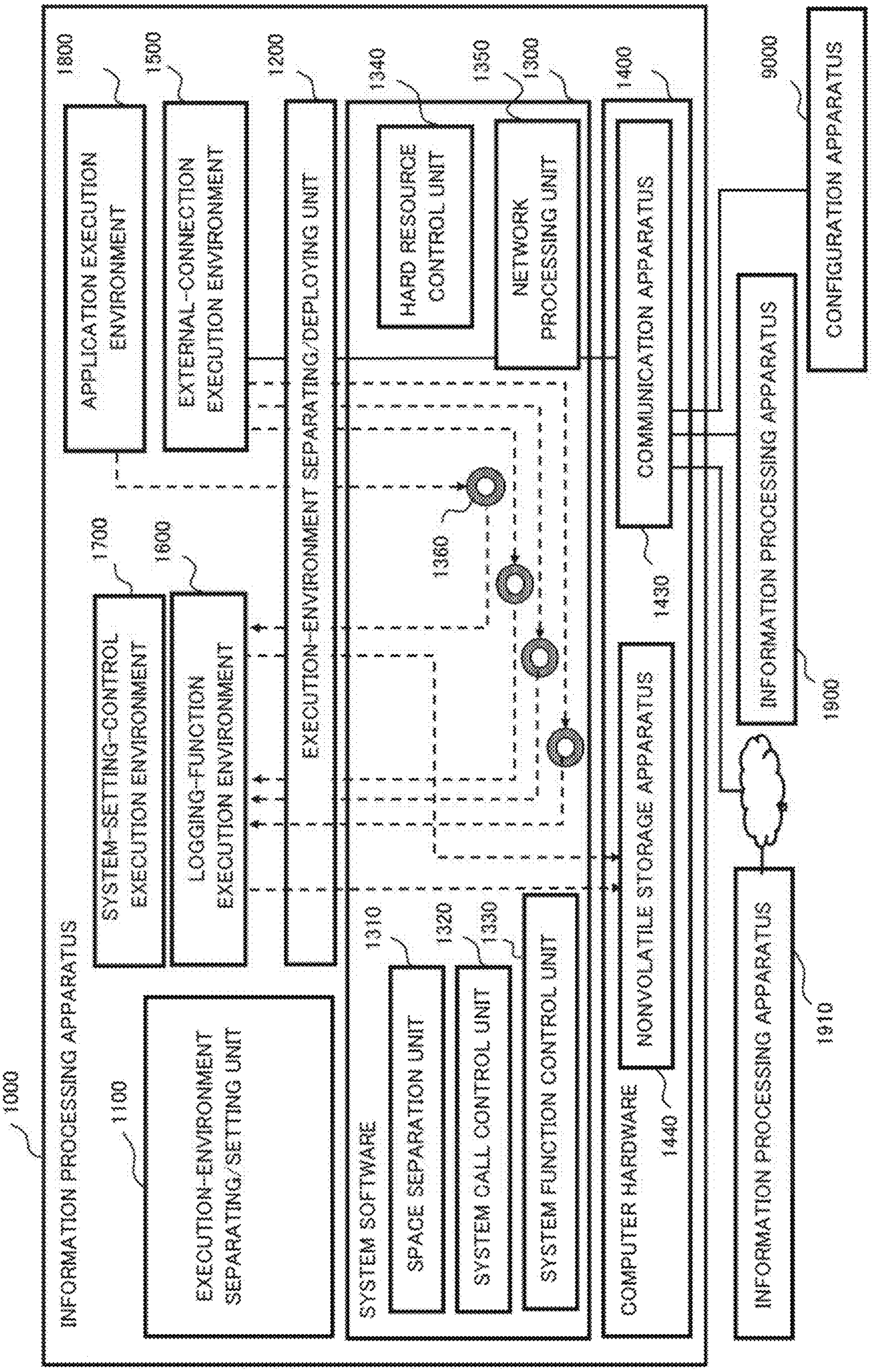
FIG. 6 is a block diagram representing the configuration of a system software for the information processing apparatus according to Embodiment 1.

FIG. 6 is a block diagram representing the configuration of the system software 1300 of the information processing apparatus 1000 according to Embodiment 1. The system software 1300 includes at least a space separation unit 1310, a system call control unit 1320, a system function control unit 1330, a hard resource control unit 1340, the network processing unit 1350, and the write-once circular buffer 1360.

The space separation unit 1310 controls space separation of the execution environments. Space separations include at least a process ID space, a user/group ID space, a mount point space, an inter-process communication space, a host/domain name space, and a network space.

The system call control unit 1320 performs at least system-call permission control of functional programs that operate in the execution environments. The system function control unit 1330 performs at least system-function permission control of functional programs that operate in the execution environments.

The hard resource control unit 1340 at least applies allocation control of the hardware resources in the computer hardware 1400 and hardware-device access control to the functional programs that operate in the execution environments. Combining these functions in the system software 1300 makes it possible to support configuration of arbitrary two or more separated execution environments.

The network processing unit 1350 performs transmission and reception of communication data between itself and the information processing apparatuses 1900 and 1910 and the configuration apparatus 9000 that are connected with the information processing apparatus 1000 and performs basic communication protocol processing of the transmitted and received communication data. The write-once circular buffer 1360 is a memory recording mechanism that enables additional writing and reading of log data. Neither modification nor deletion of after-writing data cannot be made.

<Execution-Environment-Separation Definition Table>

FIG. 7 is a first drawing representing the execution-environment-separation definition table 1130 for the information processing apparatus 1000 according to Embodiment 1. FIG. 8 is a second drawing representing the execution-environment-separation definition table 1130. FIG. 7 and FIG. 8 represent the whole of the execution-environment-separation definition table 1130.

FIG. 7 indicates that the execution-environment-separation definition table 1130 has identifiers 2000, execution environment names 2001, space separation setting items 2002, execution-environment file system setting items 2003, and system-call permission lists 2004. FIG. 8 indicates that the execution-environment-separation definition table 1130 has system-function permission lists 2005, resource-allocation setting items 2006, device-access-control setting items 2007, and activation start sequence 2008.

In the column of the identifiers 2000, the identifiers indicating the execution environments 1500 through 1800 are described. In the column of the execution environment names 2001, the names of the execution environments 1500 through 1800 are described. In the column of the space separation setting items 2002, there are described the spaces, to which separation setting is applied, among spaces to be supplied to each of the execution environments 1500 through 1800 by the system software 1300. The space separations include at least the process ID space, the user/group ID space, the mount point space, the inter-process communication space, the host/domain name space, and the network space.

In the column of the execution-environment file system setting items 2003, there are described root file systems to be allocated to the execution environments 1500 through 1800 and file-system paths to be shared by the system software 1300 for the execution environments 1500 through 1800. In the column of the system-call permission lists 2004, there are described the lists of system calls for which the system software 1300 is permitted to issue the function programs that operate in the execution environments 1500 through 1800. In addition, there may be described specification of arguments to be permitted for each of the described system calls (unillustrated). In the description of the argument specification, regular expression may be utilized.

In the column of the system-function permission lists 2005, there are described the lists of the functions, among the functions included in the system software 1300, which are permitted to be utilized for the function programs that operate in the execution environments 1500 through 1800. In the column of the resource-allocation setting items 2006, there are described setting items of the resources managed by the system software 1300 for the execution environments 1500 through 1800.

For example, the description of the resource-allocation setting items 2006 in the external-connection execution environment 1500, in the case where the column of the identifiers 2000 in FIG. 8 is C0, will be explained. In the resource-allocation setting items 2006, with regard to the calculation core of the calculation apparatus 1410, a calculation-core time allocation (in FIG. 8, the setting in which the calculation-core allocation of quota_C0[us]/period_C0 [us] is secured is exemplarily represented) is described. Moreover, a maximum calculation-core usage rate (in FIG. 8, the setting in which the calculation-core maximum allocation of usage_C0[%] is secured is exemplarily represented) and a calculation-core allocation (in FIG. 8, the setting in which the calculation cores 2 and 3 are allocated is exemplarily represented) are exemplarily represented.

With regard to the main storage apparatus 1420, a memory maximum allocation (in FIG. 8, the setting in which the memory maximum allocation of limit_mem_C0 [Byte] is secured is exemplarily represented) is exemplarily represented. With regard to the communication apparatus 1430, a communication maximum bandwidth allocation (in FIG. 8, the setting in which the communication maximum bandwidth allocation of limit_bw_C0 [Bytes/s] is secured is exemplarily represented) is exemplarily represented.

Moreover, with regard to the nonvolatile storage apparatus 1440, a block-I/O maximum bandwidth allocation (in FIG. 8, the setting in which the block-I/O maximum bandwidth allocation of limit_block_C0 [Bytes/s] is secured is exemplarily represented) is exemplarily represented. As the resource-allocation setting in the system software 1300, a maximum number of operable processes that can operate in the execution environments 1500 through 1800 (in FIG. 8, the setting of the maximum process number of PIDS_C0 is exemplarily represented) is exemplarily represented. In addition, it may be allowed that as the resource-allocation setting items 2006, not only the foregoing examples but also control setting items of other resources managed by the system software 1300 are described.

In the device-access-control setting items 2007, there are described access-control setting items of the devices managed by the system software 1300 for the execution environments 1500 through 1800. For example, in the description of the device-access-control setting items 2007 in the external-connection execution environment 1500, permission of reading access to the nonvolatile storage apparatus 1440 (in FIG. 8, {nonvolatile storage apparatus, Read} is described) and permission of transmission/reception by the communication apparatus 1430 (in FIG. 8, {communication apparatus, SendRecv} is described) are exemplarily represented.

The description of the device-access-control setting items 2007 in the logging-function execution environment 1600, in the case where the column of the identifiers 2000 in FIG. 8 is C2, will be explained. Permission of reading/writing access to the nonvolatile storage apparatus 1440 (in FIG. 8, {nonvolatile storage apparatus, ReadWrite} is described) is exemplarily represented.

The description of the device-access-control setting items 2007 in the system-setting-control execution environment 1700, in the case where the column of the identifiers 2000 in FIG. 8 is C3, will be explained. Permission of reading/writing access to the nonvolatile storage apparatus 1440 (in FIG. 8, {nonvolatile storage apparatus, Read Write} is described) is described. Permission of transmission/reception by the communication apparatus 1430 and permission of control thereof (in FIG. 8, {communication apparatus, SendRecvCtrl} is described) and permission of all access to the security module apparatus 1450 (in FIG. 8, {security module apparatus, All} is described) are described.

A FIFO file shared with the system software 1300 exists and permission of reading/writing access thereto (in FIG. 8, {FIFO_C3, ReadWrite} is described) is exemplarily represented; a Socket file shared with the system software 1300 exists and permission of reading/writing access thereto (in FIG. 8, {Socket_C3, ReadWrite} is described) is exemplarily represented.

Although being devices not linked with the computer hardware 1400, the exemplarily represented FIFO and Socket files are pseudo devices that are managed by the system software 1300 and are utilized when data is transmitted and received between the functional programs. In addition, it may be allowed that as the device-access-control setting items 2007, not only the foregoing examples but also control setting items of access to other resources managed by the system software 1300 are described.

In the activation start sequence 2008, the activation start sequence in the execution environments 1500 through 1800 is described. It may be allowed that the respective dependence degrees of the functional processing items among the execution environments 1500 through 1800 is described.

<Logging-Function-Setting Definition Table>

FIG. 9 is a drawing representing the logging-function-setting definition table 1140 for the information processing apparatus 1000 according to Embodiment 1. The logging-function-setting definition table 1140 includes logging function names 3000, logging-buffer setting items 3001, logging-buffer access functions 3002, and logging-file setting items 3003.

In the column of the logging function names 3000, the logging function manes of logging functions that operate in the logging-function execution environment 1600 are described along with the respective identifiers 2000 of the logging-function execution environment 1600. The logging-buffer setting items 3001 are allocated to the logging function for each of the logging function names 3000. The write-once circular buffer 1360 and the size value of the write-once circular buffer 1360 are described.

In the column of the logging-buffer access functions 3002, the execution environments (1500, 1700 through 1800) that access the write-once circular buffer 1360 and the functions that operate in the execution environments (1500, 1700 through 1800) that access the write-once circular buffer 1360. In the column of the logging-file setting items 3003, there are described logging files in each of which the logging function that operates in the logging-function execution environment 1600 records and retains the contents of the write-once circular buffer 1360. In addition, the logging file may be retained in the nonvolatile storage apparatus 1440.

<Configuration-Risk Definition Table>

FIG. 10 is a drawing representing the configuration-risk definition table 1150 for the information processing apparatus 1000 according to Embodiment 1. The configuration-risk definition table 1150 includes risk identifiers 4000, risk definitions 4001, risk values 4002, and a configuration-timing evaluation 4003.

In the column of the risk identifiers 4000, there are described identifiers that specify the risk definitions of security risks in the setting description of the execution-environment-separation definition table 1130 In the column of the risk definitions 4001, the execution environments 1500 through 1800 that each include security risks and separation setting items for the execution environments 1500 through 1800 are described.

Moreover, the column of the risk definitions 4001 includes at least logic evaluation equations based on the risk identifiers 4000 and evaluation equations based on the summation of the risk values 4002. In FIG. 10, in the case where the risk identifier 4000 is R0, the external-connection execution environment 1500, as the execution environment, and the separation definition saying that in the device-access-control setting items 2007, there exists setting that permits reading/writing access to the nonvolatile storage apparatus 1440, are exemplarily represented in the risk definitions 4001.

As an example of the logic evaluation equation, the logical multiplication of the risk identifier R0 and the risk identifier R2, as the risk evaluation equation, is exemplarily represented in the risk definition 4001 in the case where the risk identifier 4000 is Rm. As an example of the evaluation equation based on the summation of the risk values 4002, the risk definitions 4001 in the case where the risk identifier 4000 is Rn is exemplarily represented.

In the risk values 4002, a risk value indicating the risk degree of the risk definition 4001 is described. Moreover, the risk values 4002 includes at least a risk value indicating an unacceptable risk definition (in FIG. 10, "Unacceptable" is exemplarily represented).

The configuration-timing evaluation 4003 indicates a risk evaluation of the whole configuration of the information processing apparatus 1000. In the configuration-timing evaluation 4003, information on the configuration-timing evaluation by the configuration-risk evaluation unit 1120 is described. The information in the configuration-timing evaluation 4003 includes at least information on whether the evaluation is "acceptable" or "inappropriate". For example, FIG. 10 exemplarily represents that the configuration-timing evaluation is acceptable and the risk-value summation calculated by the configuration-risk evaluation unit 1120 in the case where the evaluation is accepted. In addition, FIG. 10 exemplarily represents that the configuration-timing evaluation is "inappropriate" and the risk identifier 4000 of the risk definition 4001 that is determined as unacceptable by the configuration-risk evaluation unit 1120 in the case where the evaluation is "inappropriate".

<Setting-And-Activation Processing by Activation-Setting Unit>

Figure 11:
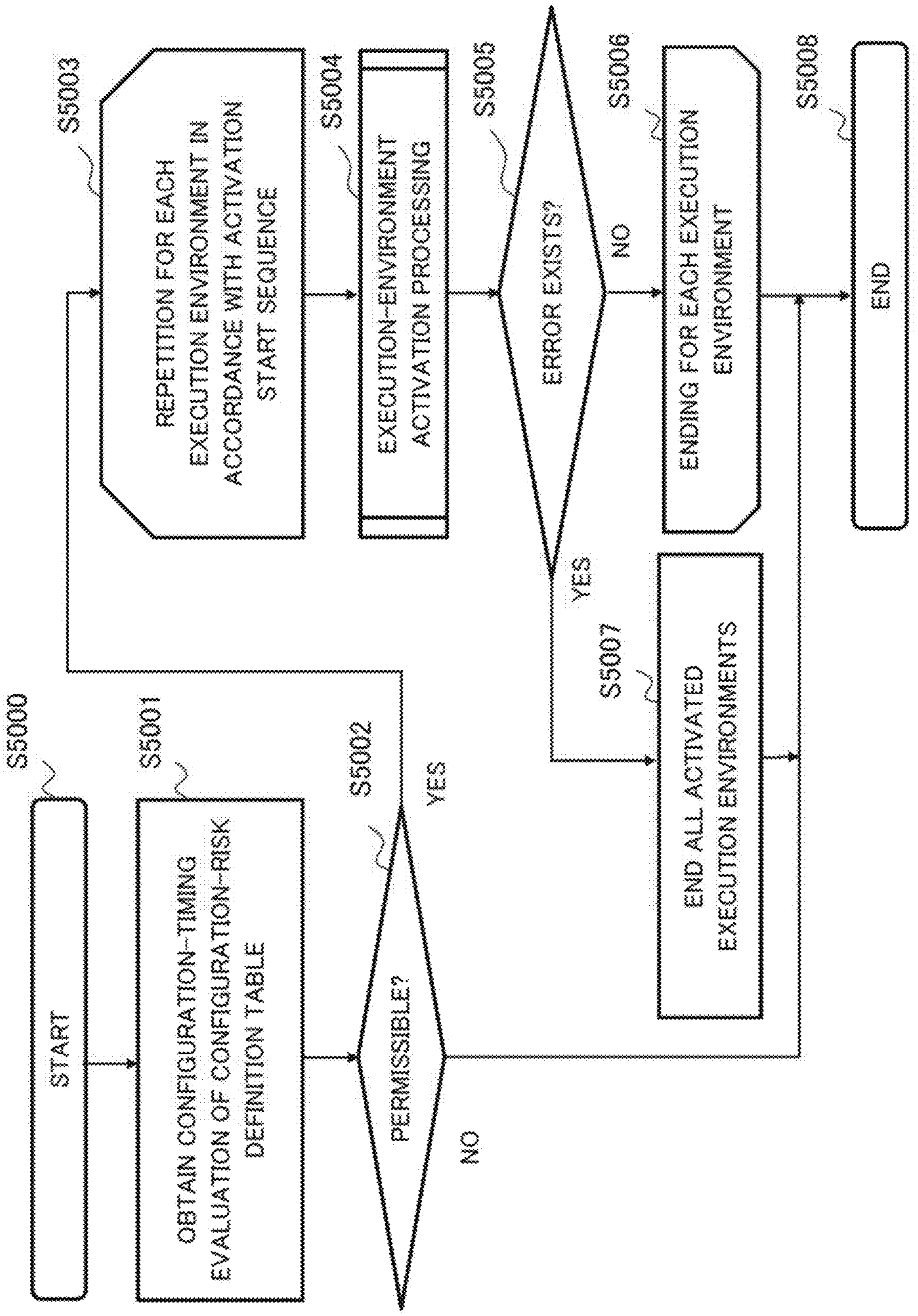
FIG. 11 is a flowchart of setting-and-activation processing by an activation-setting unit in the information processing apparatus according to Embodiment 1.

FIG. 11 is a flowchart in which the activation-setting unit 1110 of the execution-environment separating/setting unit 1100 in the information processing apparatus 1000 according to Embodiment 1 performs setting-and-activation processing. It may be allowed that the processing represented in FIG. 11 is executed each time software is changed, updated, or started in the information processing apparatus 1000.

In the step S5000, the activation-setting unit 1110 setting-and-activation processing. In the step S5001, the activation-setting unit 1110 obtains the configuration-timing evaluation 4003 in the configuration-risk definition table 1150.

In the step S5002, the activation-setting unit 1110 determines whether or not the configuration-timing evaluation 4003 is "acceptable". In the case where the configuration-timing evaluation 4003 is "acceptable" (the determination result is "YES"), the step S5002 is followed by the step S5003. In the case where the execution-environment configuration-timing evaluation 4003 is "inappropriate" (the determination is "NO"), the step S5002 is followed by the step S5008, where the processing is ended.

In the step S5003, in accordance with the activation start sequence 2008 in the execution-environment-separation definition table 1130, the activation-setting unit 1110 repeats the processing in the steps S5003 through S5006 for each of the execution environment names 2001.

In the step S5004, the activation-setting unit 1110 creates an execution-environment activation process for activating the execution environments 1500 through 1800 and performs activation processing based on the created execution-environment activation process. The details of the execution-environment activation processing in the step S5004 will be represented in FIGS. 12 and 13. The processing in each of FIGS. 12 and 13 may be a subroutine to be called in the step S5004.

In the step S5005, the activation-setting unit 1110 obtains a result notice for the execution-environment activation processing based on the execution-environment activation process, and determines whether or not the processing has been successful, i.e., whether or not the result of the activation processing has been good, depending on existence of an error. In the case where no error exists (the determination is "NO"), the step S5005 is followed by the step S5006. In the case where an error exists and the processing is not successful (the determination is "NO"), the step S5005 is followed by the step S5007.

In the step S5006, the activation-setting unit 1110 determines whether or not each of the execution environment names 2001 in the execution-environment-separation definition table 1130 has been completed. In the case where each of the execution environment names 2001 in the execution-environment-separation definition table 1130 has been completed, the step S5006 is followed by the step S5008. In the case where any of the execution environment names 2001 has not been completed, the step S5003 is resumed.

In the step S5007, the activation-setting unit 1110 ends all the activated execution environments 1500 through 1800. After that, the step S5007 is followed by the step S5008. In the step S5008, the activation-setting unit 1110 ends the setting-and-activation processing.

<Activation Processing by Activation-Setting Unit>

Figure 12:
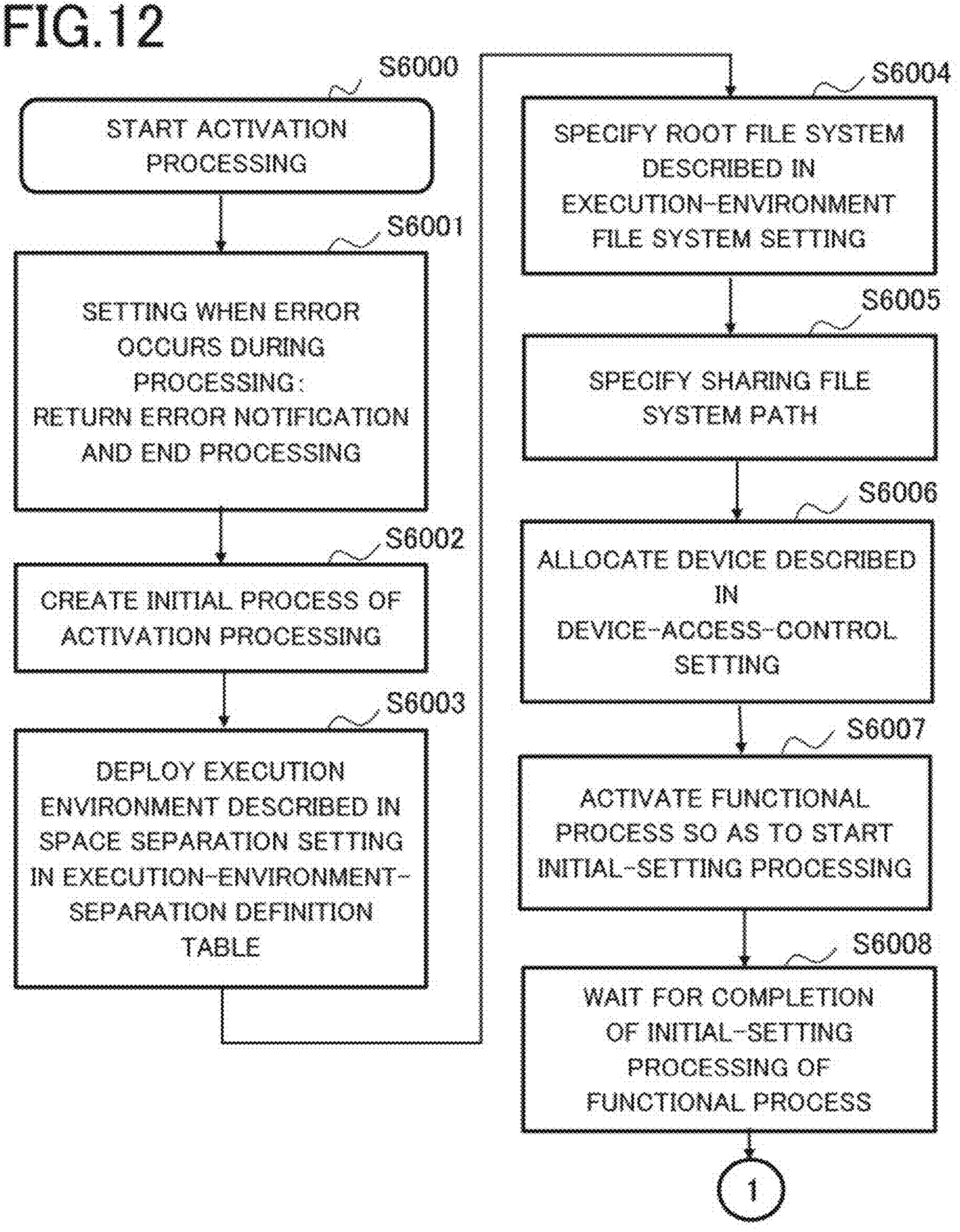
FIG. 12 is a first flowchart of activation processing by the activation-setting unit 1110 in the information processing apparatus according to Embodiment 1.
Figure 13:
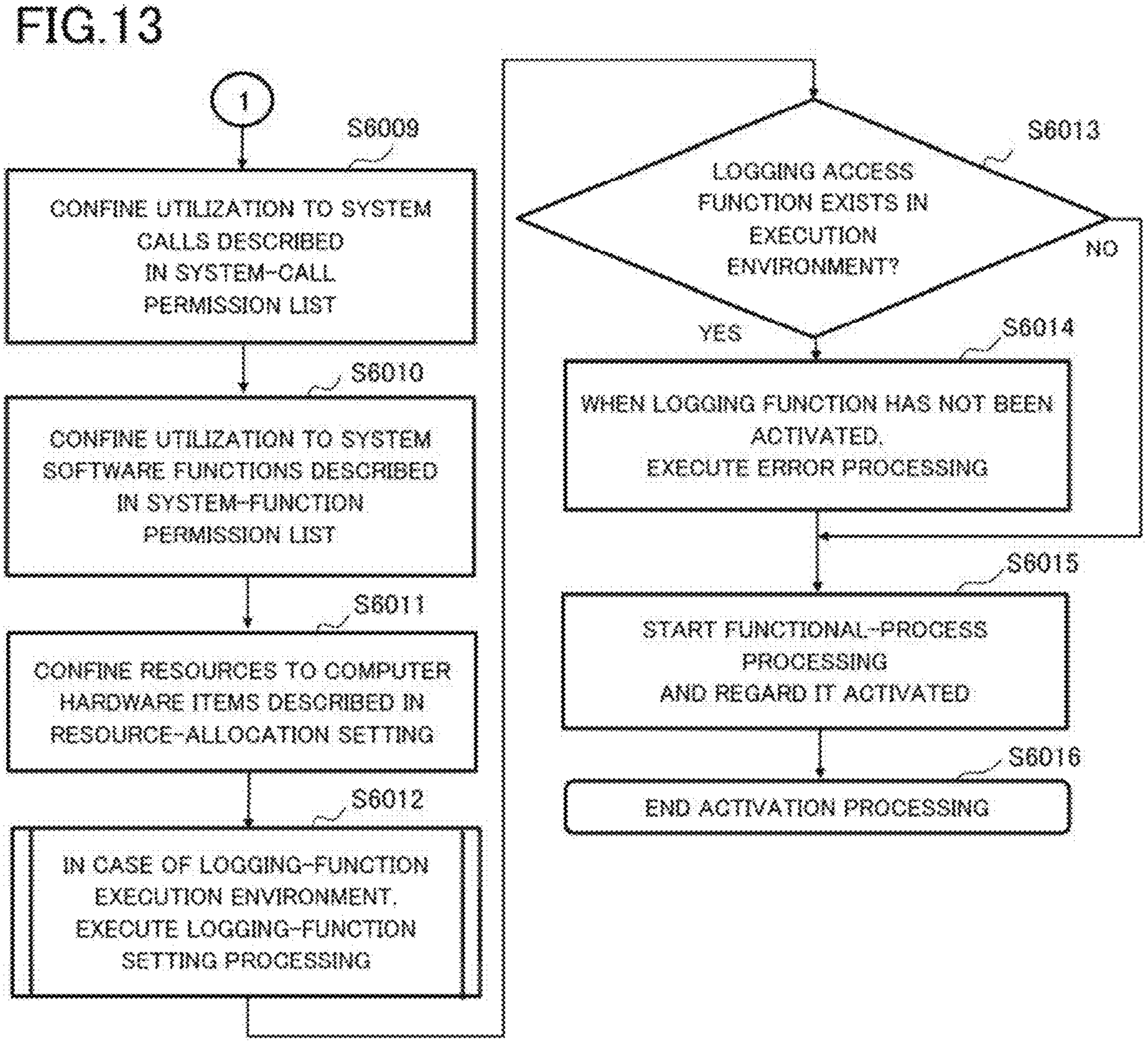
FIG. 13 is a second flowchart of the activation processing by the activation-setting unit in the information processing apparatus according to Embodiment 1.

FIG. 12 is a first flowchart of activation processing by the activation-setting unit 1110 in the information processing apparatus 1000 according to Embodiment 1. FIG. 13 is a second flowchart of the activation processing. FIG. 13 represents the rest of the flowchart in FIG. 12. The processing to be started in FIG. 12 represents the details of the execution-environment activation processing in the step S5004 in FIG. 11.

In the step S6000, the activation processing is started based on the execution-environment activation process created by the activation-setting unit 1110. The execution of the processing based on the execution-environment activation process can substantially be regarded as the execution of the processing by the activation-setting unit 1110. In the step S6001, the execution-environment activation process performs the setting in which when an error occurs during an activation processing process, an error-result notice is returned to the activation-setting unit 1110, as the calling source, and then the activation processing process is ended in the step S6016.

In the step S6002, the execution-environment activation process creates respective initial processes for the execution environments 1500 through 1800. In the step S6003, for the initial process, through the execution-environment separating/deploying unit 1200, the execution-environment activation process performs, in the space separation unit 1310 of the system software 1300, space separation setting specified by the space separation setting items 2002 in the execution-environment-separation definition table 1130.

In the step S6004, the execution-environment activation process changes the respective root file systems in the execution environments 1500 through 1800 to the root file systems specified by the execution-environment file system setting items 2003. In the step S6005, the execution-environment activation process performs sharing setting of the respective paths, between the system software 1300 and the execution environments 1500 through 1800, that are specified by a sharing file system path in the execution-environment file system setting items 2003.

In the step S6006, the execution-environment activation process allocates respective devices specified by the device-access-control setting items 2007 to the execution environments 1500 through 1800 and enables only the permission-specified access methods. In the step S6007, the execution-environment activation process activates respective functional processes, among the initial processes in the execution environments 1500 through 1800, to be executed in the execution environments 1500 through 1800. Accordingly, the functional process is also space-separated and executed.

In the step S6008, the execution-environment activation process waits for completion of initial-setting processing of the respective functional processes to be executed in the execution environments 1500 through 1800. Then, the step S6008 is followed by the step S6009 in FIG. 13.

In the step S6009 in FIG. 13, the execution-environment activation process confines callable system calls for the execution environments 1500 through 1800. The execution-environment activation process sets, in the system call control unit 1320 of the system software 1300, system calls other than the system call specified by the system-call permission lists 2004 to be prohibited from being called for. In addition, in the case where a permitting argument is specified for each of the system calls, calling for system calls by any other means than the specified argument is set to be prohibited. In the description of the argument specification, regular expression may be utilized.

In the step S6010, the execution-environment activation process confines respective usable system functions for the execution environments 1500 through 1800. The execution-environment activation process sets, in the system function control unit 1330 of the system software 1300, system functions other than the system function specified by the system-function permission lists 2005 to be prohibited from being utilized.

In the step S6011, the execution-environment activation process confines respective usable resources for the execution environments 1500 through 1800. The execution-environment activation process sets, in the hard resource control unit 1340 of the system software 1300, resources specified by the resource-allocation setting items 2006.

In the step S6012, in the case where the execution environment is the logging-function execution environment 1600, the execution-environment activation process executes logging-function setting processing. The details of the logging-function setting processing in the step S6012 will be represented in FIG. 14. The processing in FIG. 14 may be a subroutine to be called in the step S6012.

In the step S6013, in the case where the execution environment 1500, 1700, or 1800 has a function of accessing the write-once circular buffer 1360, the execution-environment activation process advances to the step S6014. In the case where none of the execution environment 1500, 1700, and 1800 has a function of accessing the write-once circular buffer 1360, the step S6013 is followed by the step S6015.

In the step S6014, in the case where the logging-function execution environment 1600 has not been activated, the execution-environment activation process executes error processing. In the step S6015, the execution-environment activation process starts after-initial-setting processing of the functional process in each of the execution environments 1500 through 1800. Before the processing is started, the execution-environment process concerned is regarded as activated.

In the step S6016, the execution-environment activation process ends the activation processing.

<Logging-Function Setting Processing>

Figure 14:
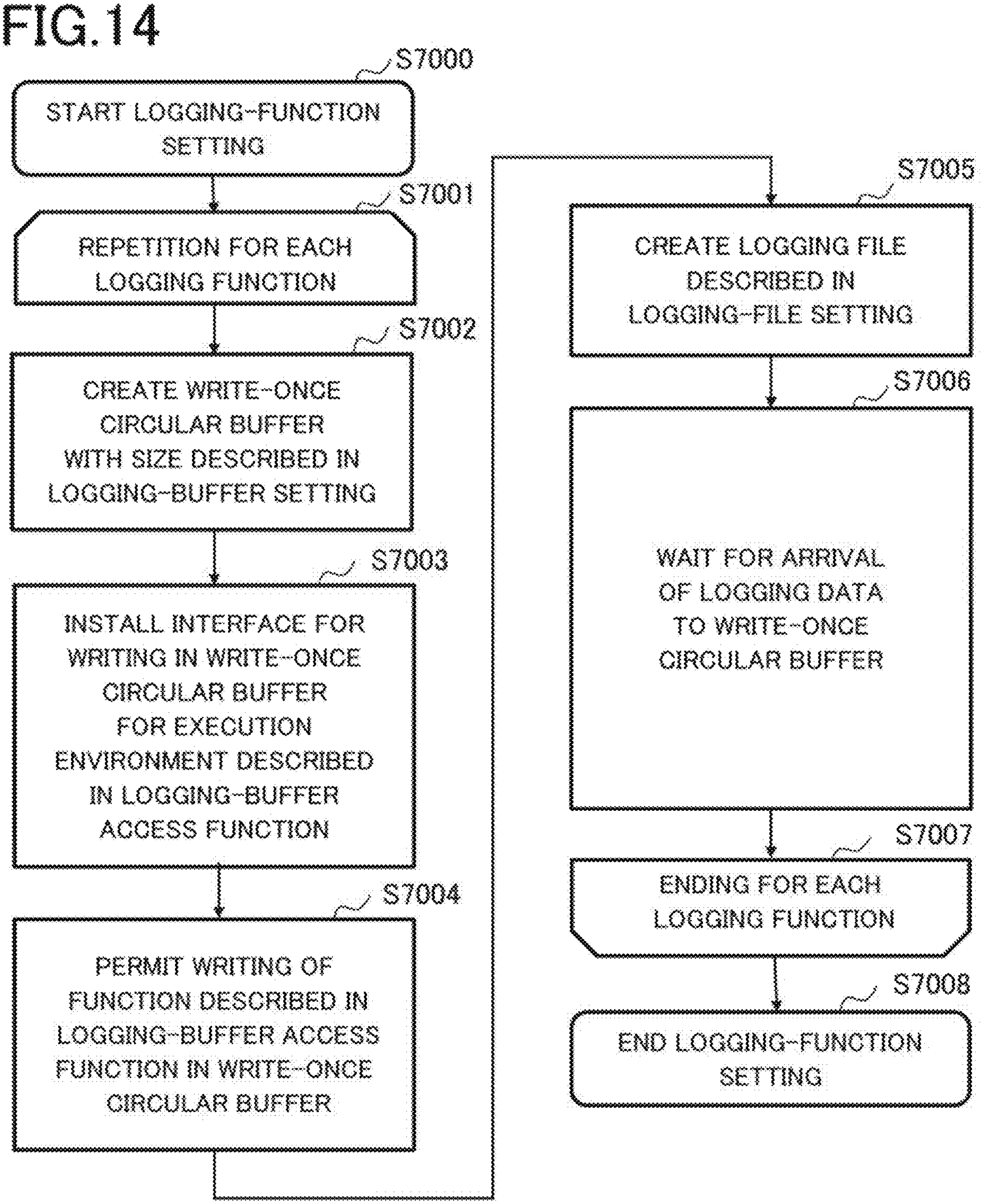
FIG. 14 is a flowchart of logging-function setting by the activation-setting unit in the information processing apparatus according to Embodiment 1.

FIG. 14 is a flowchart of logging-function setting by the activation-setting unit 1110 in the information processing apparatus 1000 according to Embodiment 1. The processing to be started in FIG. 14 represents the details of the logging-function setting processing in the step S6014 in FIG. 13.

In the step S7000, the activation-setting unit 1110 starts logging-function-setting processing. In the step S7001, in the logging-function setting processing, the activation-setting unit 1110 repeats the steps S7001 through S7007 for each of the logging functions represented in the logging function names 3000 of the logging-function-setting definition table 1140.

In the step S7002, in the logging-function setting processing, the activation-setting unit 1110 creates the write-once circular buffer 1360 having a size specified in the logging-buffer setting items 3001. In the step S7003, in the logging-function setting processing, the activation-setting unit 1110 installs respective writing interfaces for the write-once circular buffer 1360, for the execution environments 1500 through 1800 specified in the logging-buffer setting items 3002.

In the step S7004, in the logging-function setting processing, the activation-setting unit 1110 sets permission for the functions specified in the logging-buffer access functions 3002 to be written in the write-once circular buffer 1360. In the step S7005, in the logging-function setting processing, the activation-setting unit 1110 creates logging files specified in the logging-file setting items 3003, as the logging files recorded and stored in the logging function names 3000.

In the step S7006, the activation-setting unit 1110 sets the logging functions indicated in the logging function names 3000 in a waiting state, until logging data arrives at the write-once circular buffer 1360. In the logging-function setting processing, the logging function indicated in the logging function names 3000 performs reading procession of logging data and processing of recording and storing the logging data in the logging file. For this reason, the logging functions indicated in the logging function names 3000 made to wait, until the logging data arrives at the write-once circular buffer 1360.

In the step S7007, in the logging-function setting processing, the activation-setting unit 1110 determines whether or not the logging functions represented in the logging function names 3000 of the logging-function-setting definition table 1140 have been completed. In the case where each of the logging functions has been completed, the step S7007 is followed by the step S7008. In the case where any of the logging functions has not been completed, the step S7001 is resumed. In the step S7008, the activation-setting unit 1110 ends the setting process in the logging-function setting processing.

<Configuration-Risk Evaluation>

Figure 15:
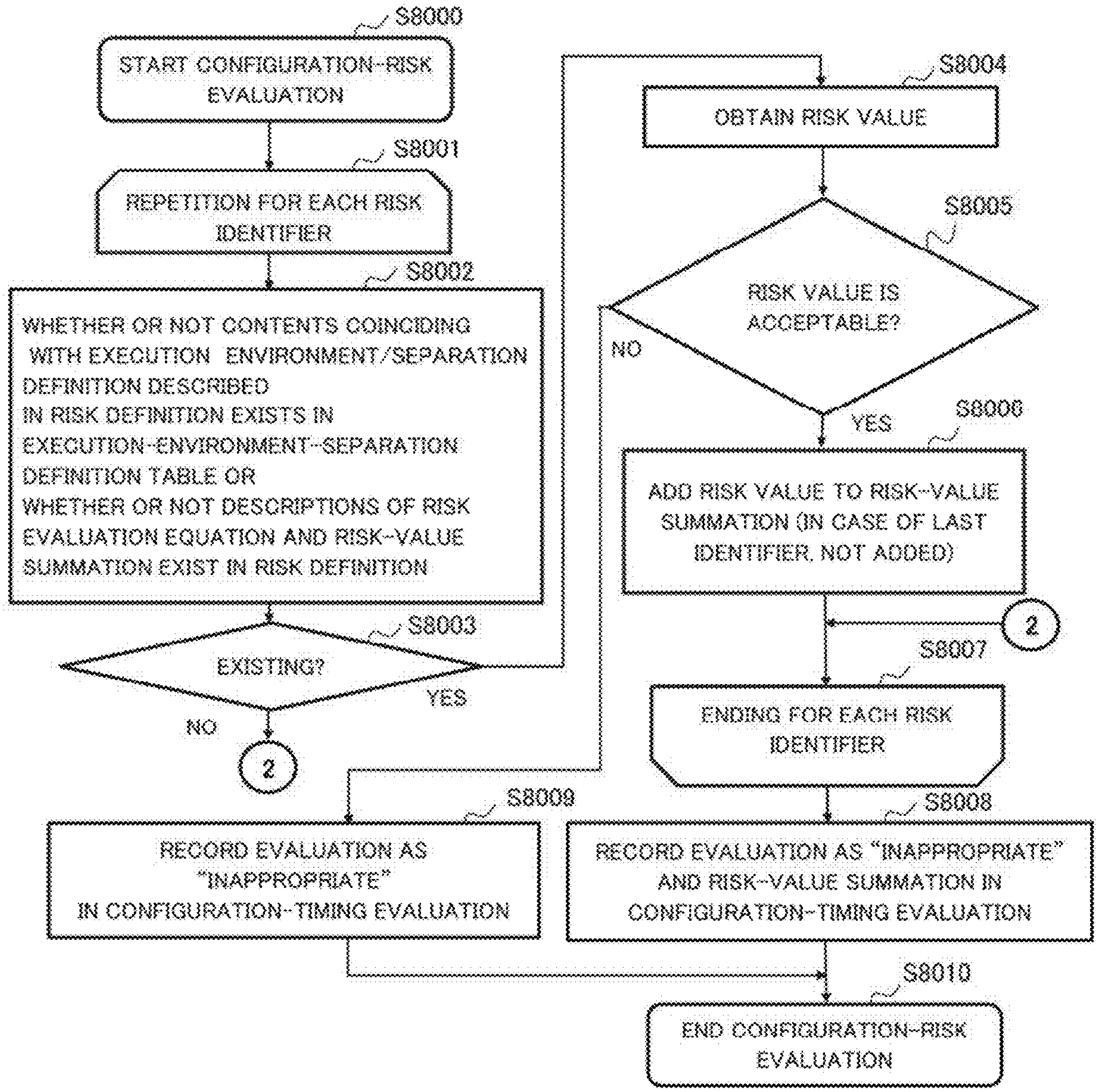
FIG. 15 is a flowchart of configuration-risk evaluation by a configuration-risk evaluation unit in the information processing apparatus according to Embodiment 1.

FIG. 15 is a flowchart of configuration-risk evaluation by the configuration-risk evaluation unit in the information processing apparatus according to Embodiment 1. In the step S8000, the configuration-risk evaluation unit 1120 starts an evaluation process.

In the step S8001, the configuration-risk evaluation unit 1120 repeats the steps S8001 through S8007 for each of the risk identifiers 4000 in the configuration-risk definition table 1150. In the step S8002, the configuration-risk evaluation unit 1120 determines whether or not any content that coincides with any of the execution environments 1500 through 1800 and any of the separation definitions specified by the risk definitions 4001 exists in the execution-environment-separation definition table 1130 or whether or not any description of the risk evaluation equation or the risk-value summation exists.

In the case where in the step S8003, it is determined that any content that coincides with the above exists (the determination is "YES"), the configuration-risk evaluation unit 1120 advances to the step S8004. In the case where no content exists (the determination is "NO"), the configuration-risk evaluation unit 1120 advances to the step S8007.

In the step S8004, the configuration-risk evaluation unit 1120 obtains the risk value 4002 specified by the risk identifier 4000. In the step S8005, the configuration-risk evaluation unit 1120 determines whether or not the risk value 4002 is acceptable. In the case where the risk value 4002 is acceptable (the determination is "YES"), the step S8005 is followed by the step S8006. Specifically, in the case where the risk value 4002 is smaller than a predetermined unacceptable value, the configuration-risk evaluation unit 1120 determines that the risk value 4002 is acceptable. In the case where the risk value 4002 is unacceptable (the determination is "NO"), the step S8005 is followed by the step S8009. Specifically, in the case where the risk value 4002 is larger than the predetermined unacceptable value, the configuration-risk evaluation unit 1120 determines that the risk value 4002 is unacceptable.

In the step S8006, the configuration-risk evaluation unit 1120 adds the risk value to a risk-value summation. In this regard, however, in the case where the identifier through which the risk value is obtained is the last risk identifier specified in the configuration-risk definition table, the risk value is not added. The risk-value summation is specified in the last section (Rn) in the column of the risk identifiers 4000; depending on whether or not the risk-value summation is smaller than Rv_rate, it is determined whether or not the risk value is acceptable. Rv_rate may be set to be the same as the foregoing unacceptable value.

In the step S8007, the configuration-risk evaluation unit 1120 determines whether or not each of the risk identifiers 4000 in the configuration-risk definition table 1150 has been completed. In the case where each of the risk identifiers 4000 has been completed, the step S8007 is followed by the step S8008. In the case where any of the risk identifiers 4000 has not been completed, the step S78007 is followed by the step S8001, the processing is repeated.

In the step S8008, the configuration-timing evaluation 4003 is recorded as "acceptable". Moreover, it may be allowed that the risk-value summation is recorded in the configuration-timing evaluation 4003.

In the step S8009, the configuration-risk evaluation unit 1120 records the configuration-timing evaluation 4003, as "acceptable". Moreover, it may be allowed that the risk identifier 4000 is recorded, as an unacceptable risk identifier, in the configuration-timing evaluation 4003.

In the step S8010, the configuration-risk evaluation unit 1120 ends the evaluation process. In addition, as exemplarily represented in FIG. 1, the processing flows in FIGS. 11 through 15 can be executed in the secure boot of the information processing apparatus 1000, while the security module apparatus 1450 is utilized as a reliable starting point and the safety is secured.

<Configuration Apparatus>

Figure 16:
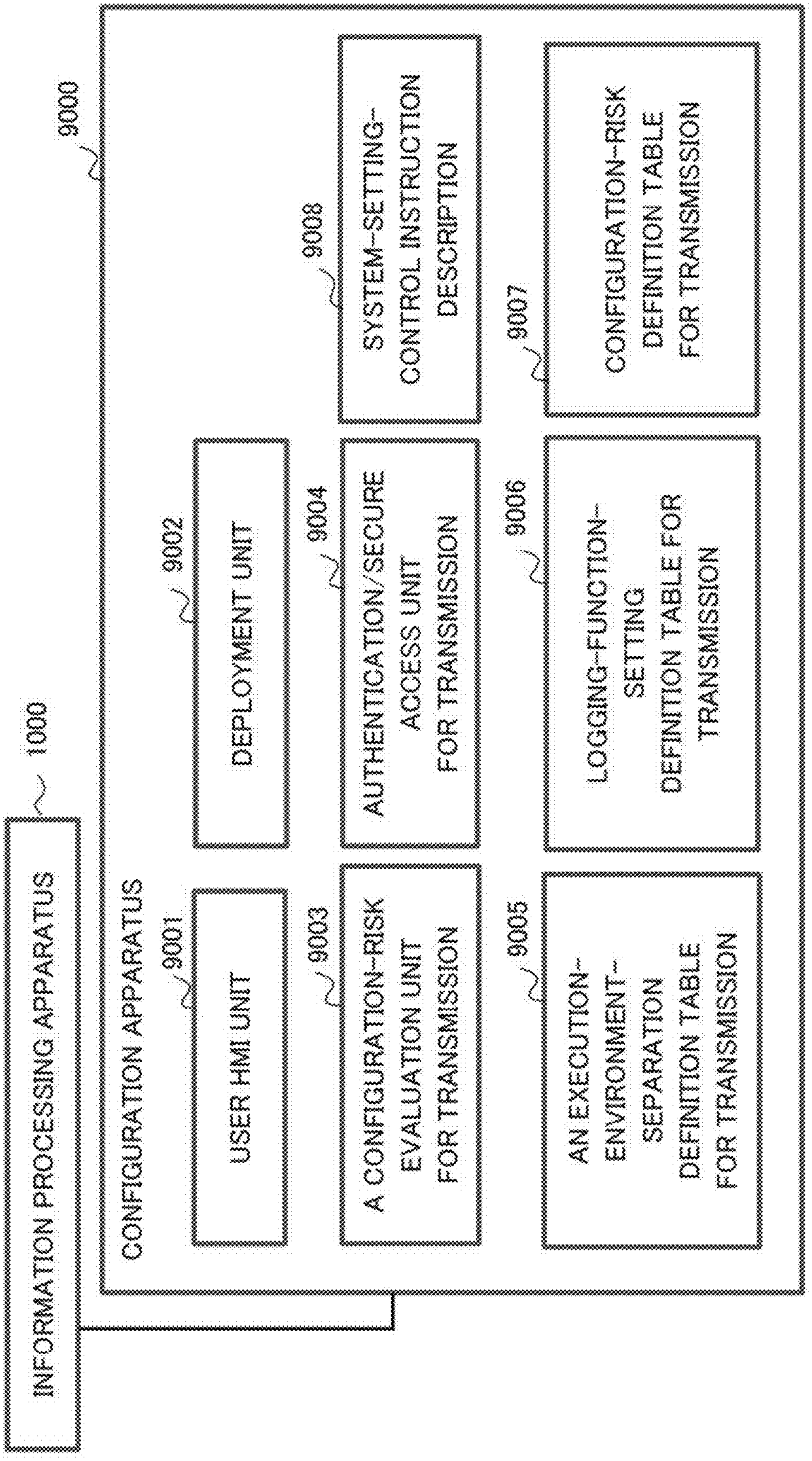
FIG. 16 is a block diagram representing the configuration of the configuration apparatus according to Embodiment 1.

FIG. 16 is a block diagram representing the configuration of the configuration apparatus 9000 according to Embodiment 1. The configuration apparatus 9000 includes at least a user HMI unit 9001, a deployment unit 9002, a configuration-risk evaluation unit for transmission 9003, an authentication/secure access unit for transmission 9004, an execution-environment-separation definition table for transmission 9005, a logging-function-setting definition table for transmission 9006, a configuration-risk definition table for transmission 9007, and a system-setting-control instruction description 9008. Deployment denotes application of software to a practical use by placing and developing the software in an actual operational environment. The deployment unit 9002 of the configuration apparatus 9000 makes the information processing apparatus 1000 change and update the configuration of software.

The user HMI unit 9001 includes a user input unit and a display unit (unillustrated). The deployment unit 9002 has a function for transmitting information including the execution-environment-separation definition table for transmission 9005, the logging-function-setting definition table for transmission 9006, the configuration-risk definition table for transmission 9007, and the system-setting-control instruction description 9008 to the system-setting-control execution environment 1700 provided in the information processing apparatus 1000.

The configuration-risk evaluation unit for transmission 9003 is the same as the configuration-risk evaluation unit 1120 provided in the information processing apparatus 1000, except that it performs risk evaluation in the configuration apparatus 9000 in response to a user's instruction through the user HMI unit 9001.

The authentication/secure access unit for transmission 9004 performs authentication/secure communication with the system-setting-control execution environment 1700 provided in the information processing apparatus 1000. The execution-environment-separation definition table for transmission 9005 is the same as the configuration-risk evaluation unit 1120 provided in the information processing apparatus 1000. It may be allowed that a user creates and changes the execution-environment-separation definition table for transmission 9005 through the user HMI unit 9001.

The logging-function-setting definition table for transmission 9006 is the same as the logging-function-setting definition table 1140 provided in the information processing apparatus 1000. It may be allowed that a user creates and changes the logging-function-setting definition table for transmission 9006 through the user HMI unit 9001.

The configuration-risk definition table for transmission 9007 has a configuration the same as that of the configuration-risk definition table 1150 provided in the information processing apparatus 1000. It may be allowed that a user creates and changes the configuration-risk definition table for transmission 9007 through the user HMI unit 9001. The system-setting-control instruction description 9008 describes processing items to be executed by the system-setting-control processing unit 1720 in the system-setting-control execution environment 1700 provided in the information processing apparatus 1000.

<System-Setting-Control Instruction Description>

FIG. 17 is a drawing representing the system-setting-control instruction description 9008 of the configuration apparatus 9000 according to Embodiment 1. The system-setting-control instruction description 9008 describes, in the respective lines, processing items to be executed by the system-setting-control processing unit 1720 in the system-setting-control execution environment 1700 provided in the information processing apparatus 1000. In addition, it may be allowed that the system-setting-control instruction description 9008 is a processing description based on a general scripting language including a conditional branch, a loop or a function, and the like; it is only necessary that the system-setting-control processing unit 1720 can execute a scripting-language processing system.

The configuration apparatus 9000 can make the information processing apparatus 1000 change and update the configuration of software while reducing the security-intrusion risk caused by a security attack so as to raise the defensiveness. With regard to the communication between the configuration apparatus 9000 and the information processing apparatus 1000, the authentication/secure access unit 1710 makes it possible to secure a communication path that can hardly be attacked and has high reliability. The processing can be executed, while the security module apparatus 1450 is utilized as a reliable starting point and the safety is secured. Moreover, the configuration-risk evaluation unit for transmission 9003 preliminarily performs risk evaluation of software items to be changed and updated, so that the risk can be avoided.

<Configuration Processing>

Figure 18:
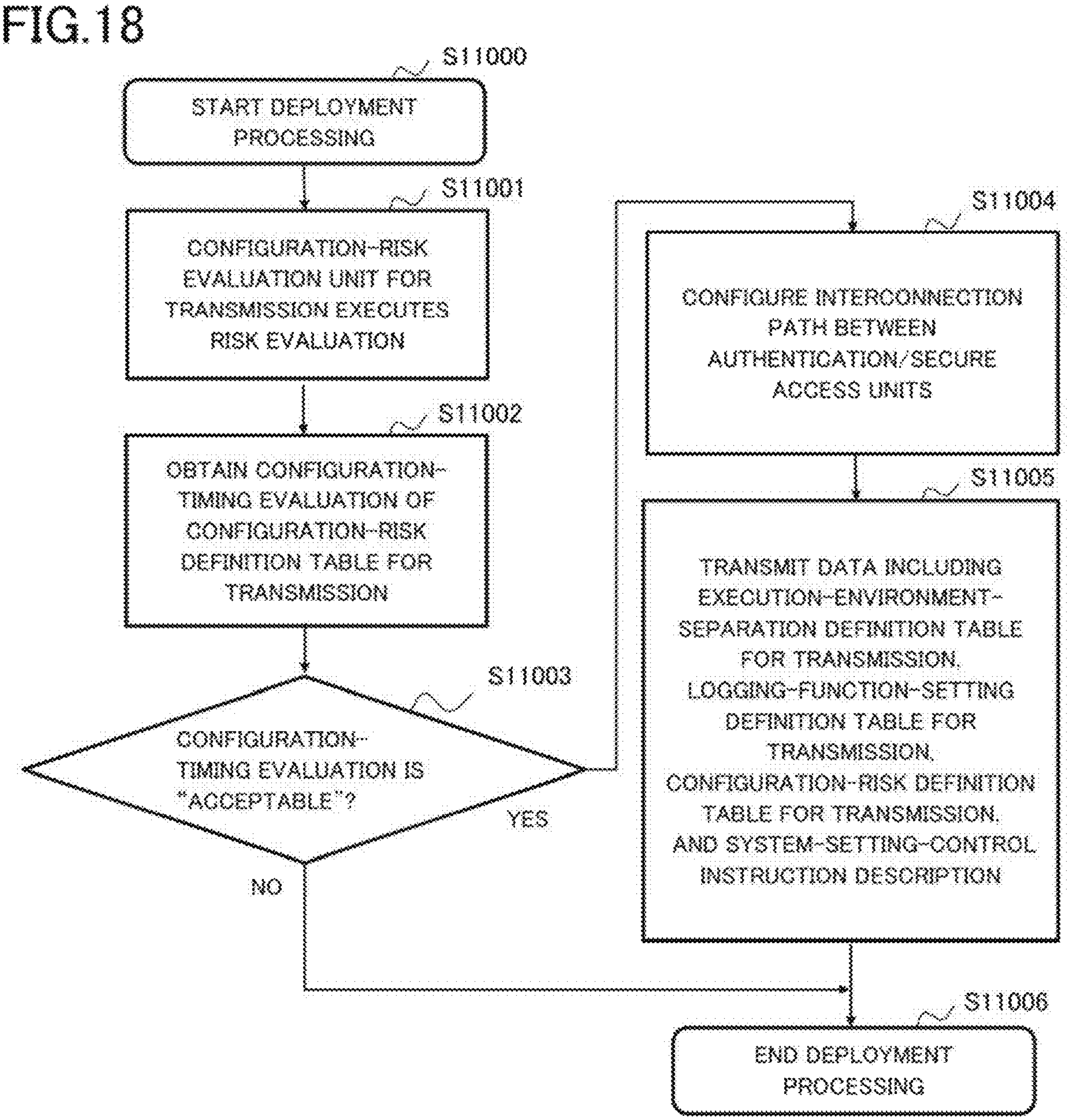
FIG. 18 is a flowchart of configuration processing by a deployment unit in the configuration apparatus according to Embodiment 1.

FIG. 18 is a flowchart of configuration processing by the deployment unit of the configuration apparatus 9000 according to Embodiment 1. An instruction, for example, for changing, updating, or activating software is transferred to the configuration apparatus 9000 through the user HMI unit 9001. In response to this, the deployment unit 9002 makes the information processing apparatus 1000 change and update the configuration of software, while reducing the security-intrusion risk caused by a security attack so as to raise the defensiveness.

In the step S11000, the deployment unit 9002 starts deployment processing. In the step S11001, the deployment unit 9002 performs risk evaluation through the configuration-risk evaluation unit for transmission 9003 provided in the configuration apparatus 9000. In addition, the execution by the configuration-risk evaluation unit for transmission 9003 is the same as the processing, represented in FIG. 15, by the configuration-risk evaluation unit 1120 provided in the information processing apparatus 1000, except that it is performed in the configuration apparatus 9000.

In the step S11002, the deployment unit obtains the configuration-timing evaluation 4003 in the configuration-risk definition table for transmission 9007 provided in the configuration apparatus 9000. In the case where in the step S11003, the configuration-timing evaluation 4003 is "acceptable" (the determination is "YES"), the step S11003 is followed by the step S11004. In the case where the configuration-timing evaluation 4003 is "inappropriate" (the determination is "NO"), the step S11003 is followed by the step S11006.

In the step S11004, the deployment unit configures a secure interconnection path between the authentication/secure access unit for transmission 9004 of the configuration apparatus 9000 and the authentication/secure access unit for transmission 1710 of the information processing apparatus 1000. In the step S11005, the deployment unit transmits data including the execution-environment-separation definition table for transmission 9005 provided in the configuration apparatus 9000, the logging-function-setting definition table for transmission 9006 provided in the configuration apparatus 9000, the configuration-risk definition table for transmission 9007 provided in the configuration apparatus 9000, and the system-setting-control instruction description 9008 provided in the configuration apparatus 9000 to the information processing apparatus 1000.

In the step S11006, the deployment unit ends the deployment-processing process. In addition, the processing flow represented in FIG. 18 is executed in the secure boot of the configuration apparatus 9000, while the safety is secured.

2. Embodiment 2

<Diagnosis Apparatus>

Figure 19:
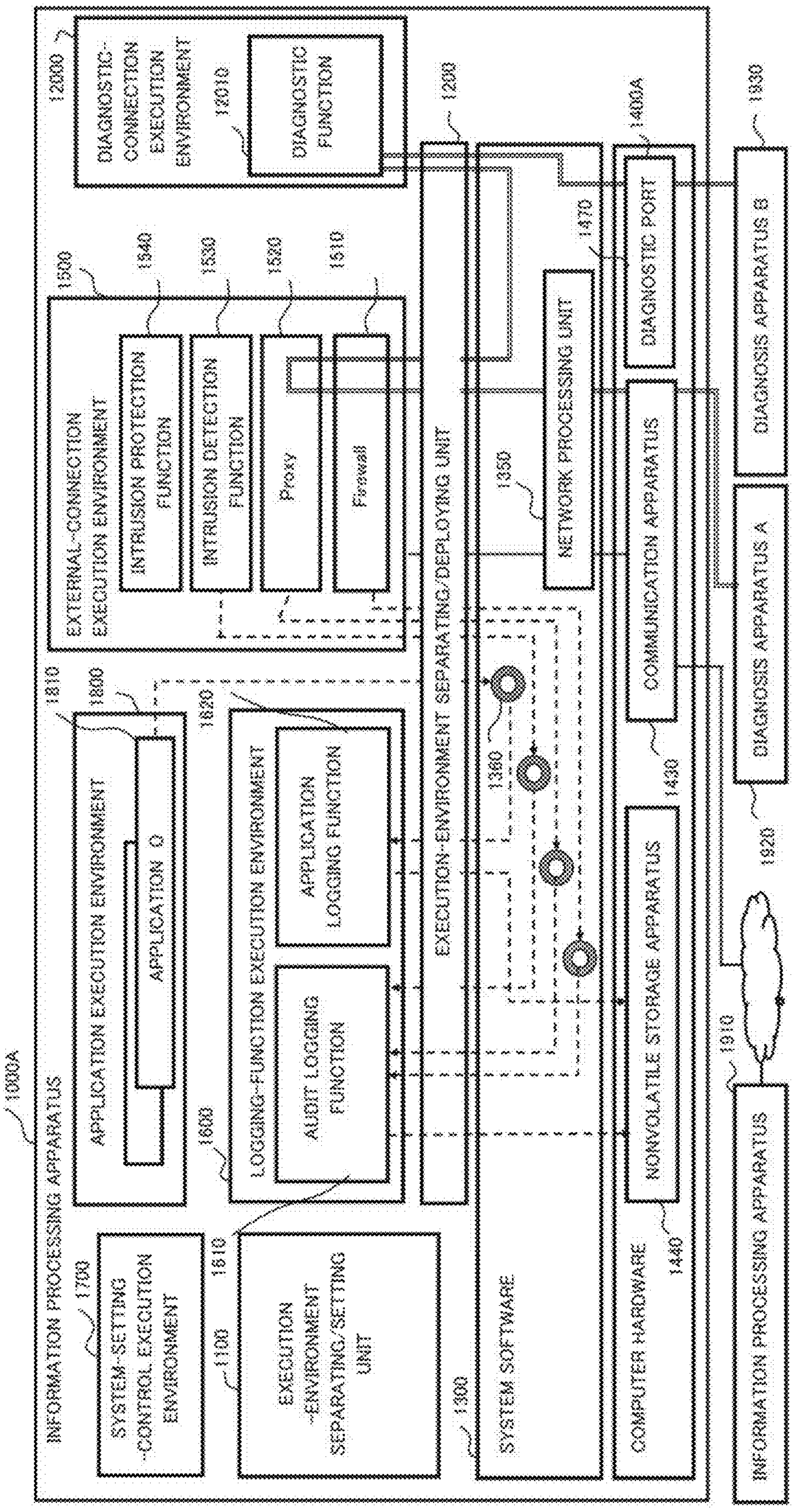
FIG. 19 is a block diagram representing the configuration of an information processing apparatus according to Embodiment 2.

FIG. 19 is a block diagram representing the configuration of an information processing apparatus 1000A according to Embodiment 2. The information processing apparatus 1000A is different from the information processing apparatus 1000 in FIG. 1 according to Embodiment 1 in that a diagnostic-connection execution environment 12000 to be configured as an execution environment, a diagnostic function 12010 in the diagnostic-connection execution environment 12000, and a diagnostic port 1470 in computer hardware 1400A are added to the information processing apparatus 1000 and in that an external diagnosis apparatus A 1920 and an external diagnosis apparatus B 1930 are connected with the information processing apparatus 1000A.

The information processing apparatus 1000A has the diagnostic-connection execution environment 12000 for connection with the external diagnosis apparatus B 1930 through the diagnostic port 1470 provided in the computer hardware 1400A. Moreover, the information processing apparatus 1000A has the external-connection execution environment 1500 for connection with the external diagnosis apparatus A 1920 through the communication apparatus 1430 provided in the computer hardware 1400A.

The diagnostic-connection execution environment 12000 is provided at least with the diagnostic function 12010 that obtains diagnostic information in the information processing apparatus 1000A and performs a diagnostic test and diagnostic control of the information processing apparatus 1000A. In addition, the external-connection execution environment 1500 is provided with a Proxy 1520 that transmits, to the diagnostic function 12010, communication data of the diagnosis apparatus A 1920 to be connected through the communication apparatus 1430.

By use of the foregoing connection method, the diagnosis apparatus A 1920 and the diagnosis apparatus B 1930 can make the information processing apparatus 1000A perform diagnosis while reducing the security-intrusion risk caused by a security attack so as to raise the defensiveness. In addition, it may be allowed that with regard to the communication between the diagnostic function 12010 and the diagnosis apparatus A 1920 or the diagnosis apparatus B 1930, the respective authentication/secure access units included in the diagnostic function 12010, the diagnosis apparatus A 1920, and the diagnosis apparatus B 1930 secure communication paths that can hardly be attacked and have high reliability.

3. Embodiment 3

<State Management Unit>

Figure 20:
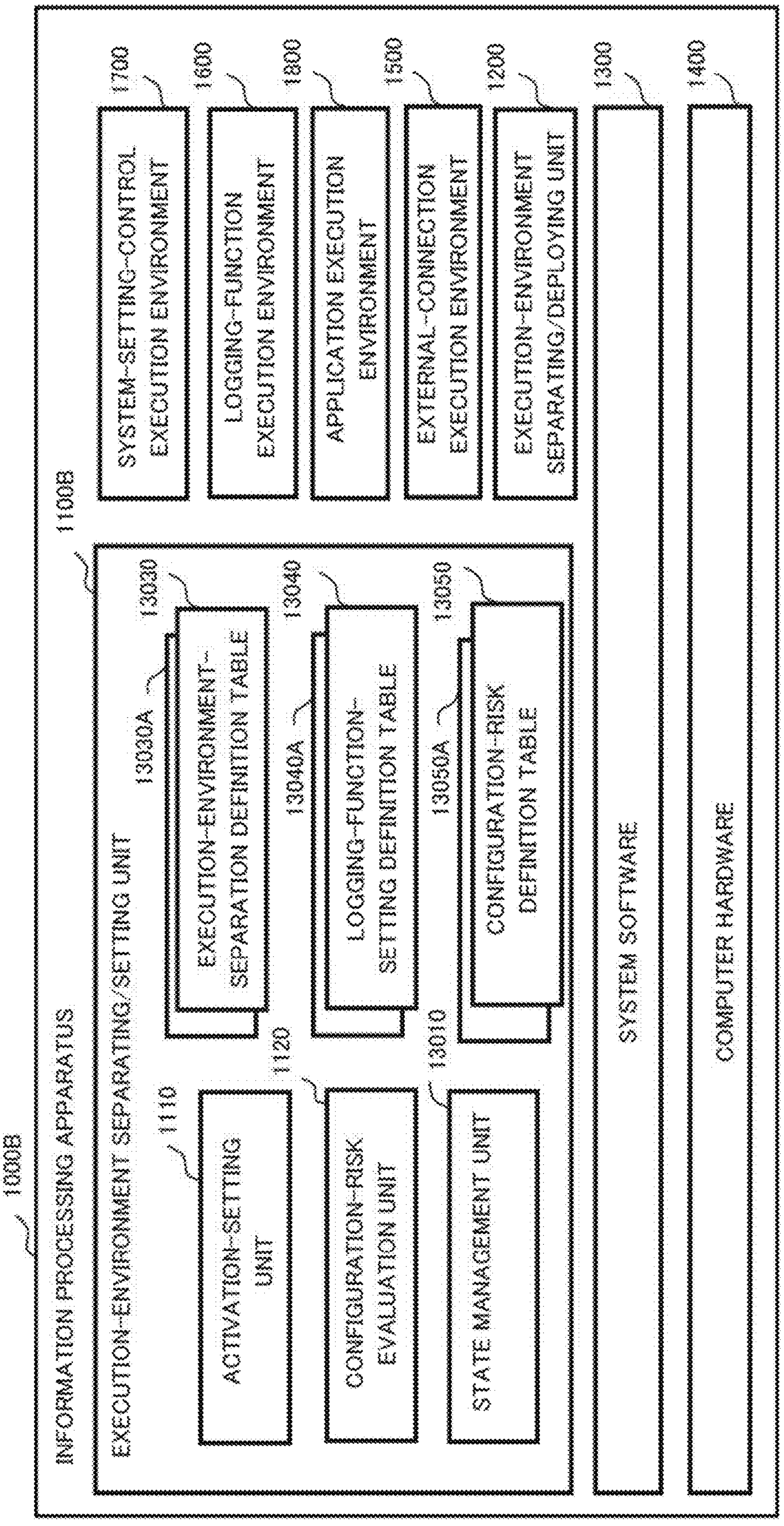
FIG. 20 is a block diagram representing the configuration of an information processing apparatus according to Embodiment 3.

FIG. 20 is a block diagram representing the configuration of an information processing apparatus 1000B according to Embodiment 3. The information processing apparatus 1000B is different from the information processing apparatus 1000 in FIG. 1 according to Embodiment 1 in that the execution-environment separating/setting unit 1100B is provided with a state management unit 13010 that manages the system state in the information processing apparatus 1000B and in that the execution-environment separating/setting unit 1100B has a selectable execution-environment-separation definition table 13030, a selectable logging-function-setting definition table 13040, and a selectable configuration-risk definition table 13050 for each of the states to be managed by the state management unit 13010. The respective items included in the foregoing tables are the same as those in the corresponding tables represented in FIGS. 7 through 10.

<State-Management Processing>

Figure 21:
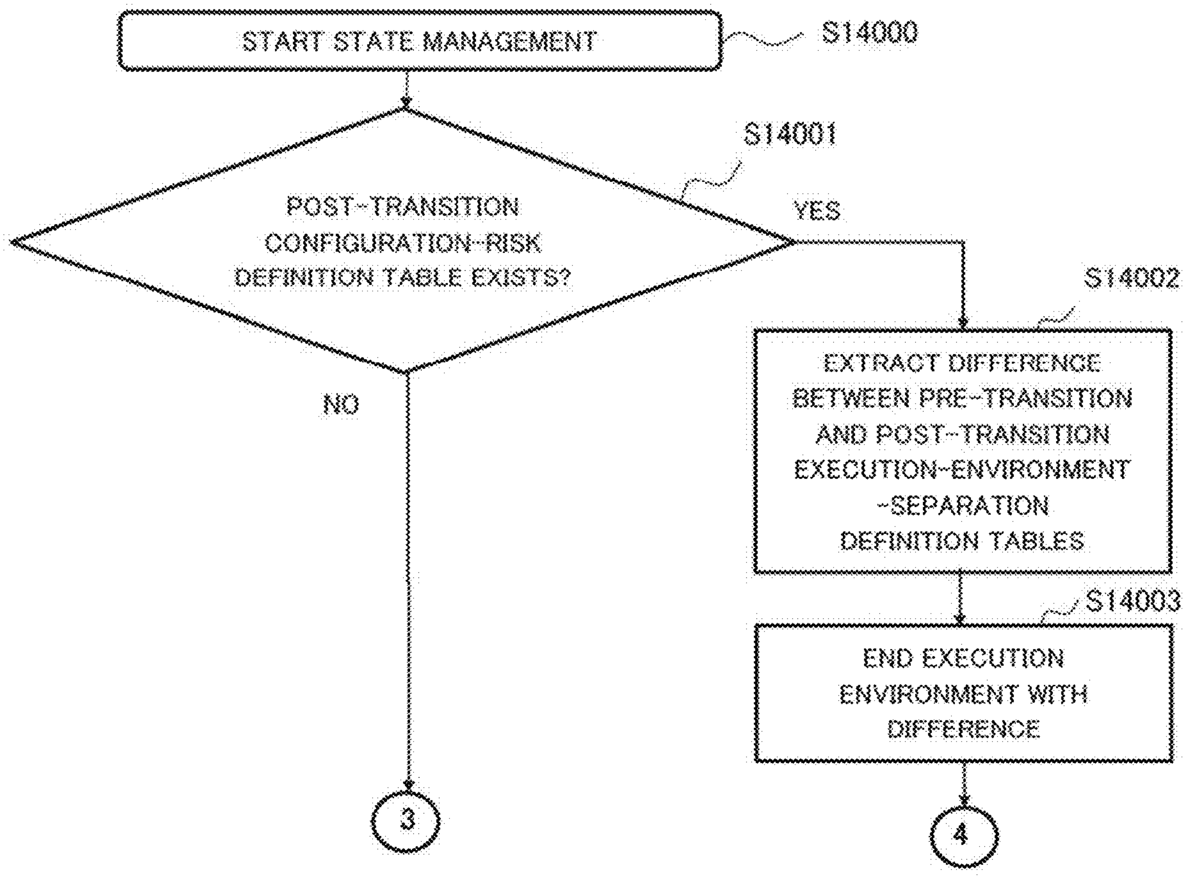
FIG. 21 is a first flowchart of state-management processing by a state management unit in the information processing apparatus according to Embodiment 3.
Figure 22:
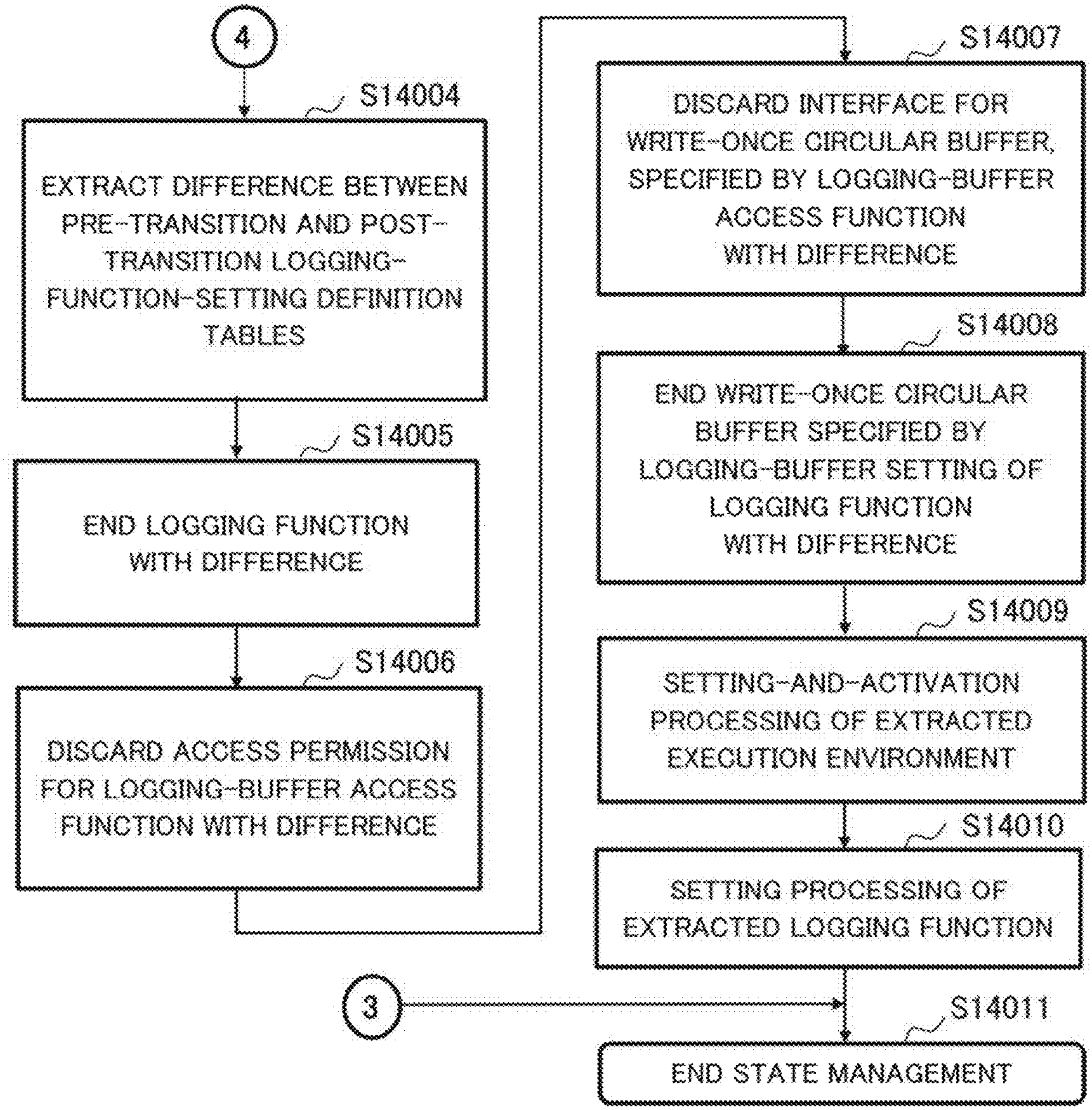
FIG. 22 is a second flowchart of the state-management processing by the state management unit in the information processing apparatus according to Embodiment 3.

FIG. 21 is a first flowchart of state-management processing by the state management unit 13010 in the information processing apparatus 1000B according to Embodiment 3. FIG. 22 is a second flowchart of the state-management processing. FIG. 22 represents the rest of the flowchart in FIG. 21.

It may be allowed that the state management unit 13010 starts the processing in response to system-state transition in the information processing apparatus 1000B. In accordance with the operation state of the information processing apparatus 1000B, a change in the ambient environment, an attack from the outside, and the intrusion situation, application software to be executed and the execution environment are changed, so that optimum operation can be performed.

In the step S14000, the state management unit 13010 starts the processing. In the step S14001, the state management unit 13010 determines whether or not there exists a second configuration-risk definition table 13050A that corresponds to the state-transition destination. In the case where there exists the second configuration-risk definition table 13050A suitable for the post-transition state (the determination is "YES"), the step S14001 is followed by the step S14002. In the case where there exists no second configuration-risk definition table 13050A suitable for the after-transition state (the determination is "NO"), the step S14001 is followed by the step S14011 (the step S14011 is represented in FIG. 22).

In the step S14002, the state management unit 13010 compares the execution-environment-separation definition table 13030 that corresponds to the state-transition source with the second execution-environment-separation definition table 13030A that corresponds to the state-transition destination. The state management unit 13010 extracts the foregoing respective execution environments that are different from each other in each of the setting items 2002 through 2007, with regard to each of the execution environment names 2001 of the tables.

In the step S14003, the state management unit 13010 performs ending processing of the extracted execution environments. Next, the step S14003 is followed by the step S14004 (the step S14004 is represented in FIG. 22).

In the step S14004, the state management unit 13010 compares the logging-function-setting definition table 13040 that corresponds to the state-transition source with the second logging-function-setting definition table 13040A that corresponds to the state-transition destination. The state management unit 13010 extracts the respective logging function names 3000 that are different from each other in each of the setting items 3001 through 3003, with regard to each of the logging function names 3000 of the tables.

In the step S14005, the state management unit 13010 performs ending processing of the extracted logging function names 3000. In the step S14006, the state management unit 13010 discards access permission set for the functions specified by the logging-buffer access functions 3002 of the extracted logging function names 3000.

In the step S14007, the state management unit 13010 discards the interfaces, for the write-once circular buffer, set for the execution environments specified by the logging-buffer access functions 3002 of the extracted logging function names 3000. In the step S14008, the state management unit 13010 performs ending processing of the write-once circular buffers specified by the logging-buffer setting items 3001 of the extracted logging function names 3000.

In the step S14009, the state management unit 13010 executes setting and activation of each of the extracted execution environments, through the activation-setting unit 1110. In the setting-and-activation processing in FIG. 11 according to Embodiment 1, the processing, to be repeated for each of the execution environments, represented in the steps S5006 through S5003 is executed in accordance with the activation start sequence. In the step S14009, it is only necessary that as the processing that repeats setting and activation in accordance with the activation start sequence, the processing the same as the setting-and-activation processing in FIG. 11 is executed only for the execution environment with the extracted difference.

In the step S14010, the state management unit 13010 executes logging-function setting of each of the extracted logging functions. In the logging-function setting in FIG. 14 according to Embodiment 1, the processing, to be repeated for each of the logging functions, represented in the steps S7001 through S7007 is executed. In the step S14010 in FIG. 22, it is only necessary that as the processing to be repeated for each of the extracted logging functions, the processing the same as the logging-function setting in FIG. 14 is executed. In the step S14011, the state management unit 13010 ends the processing.

In the information processing apparatus 1000B according to Embodiment 3, in accordance with the operation state of the information processing apparatus 1000B, a change in the ambient environment, an attack from the outside, and the intrusion situation, application software to be executed and the execution environment are changed while reducing the security-intrusion risk caused by a security attack so as to raise the defensiveness, so that optimum operation can be performed. Application software to be executed and the execution environment are changed while narrowing the security-intrusion range and hardening the information processing apparatus, so that optimum operation can be performed.

4. Embodiment 4

<Information Processing Apparatus Based on Virtual Machines>

Figure 23:
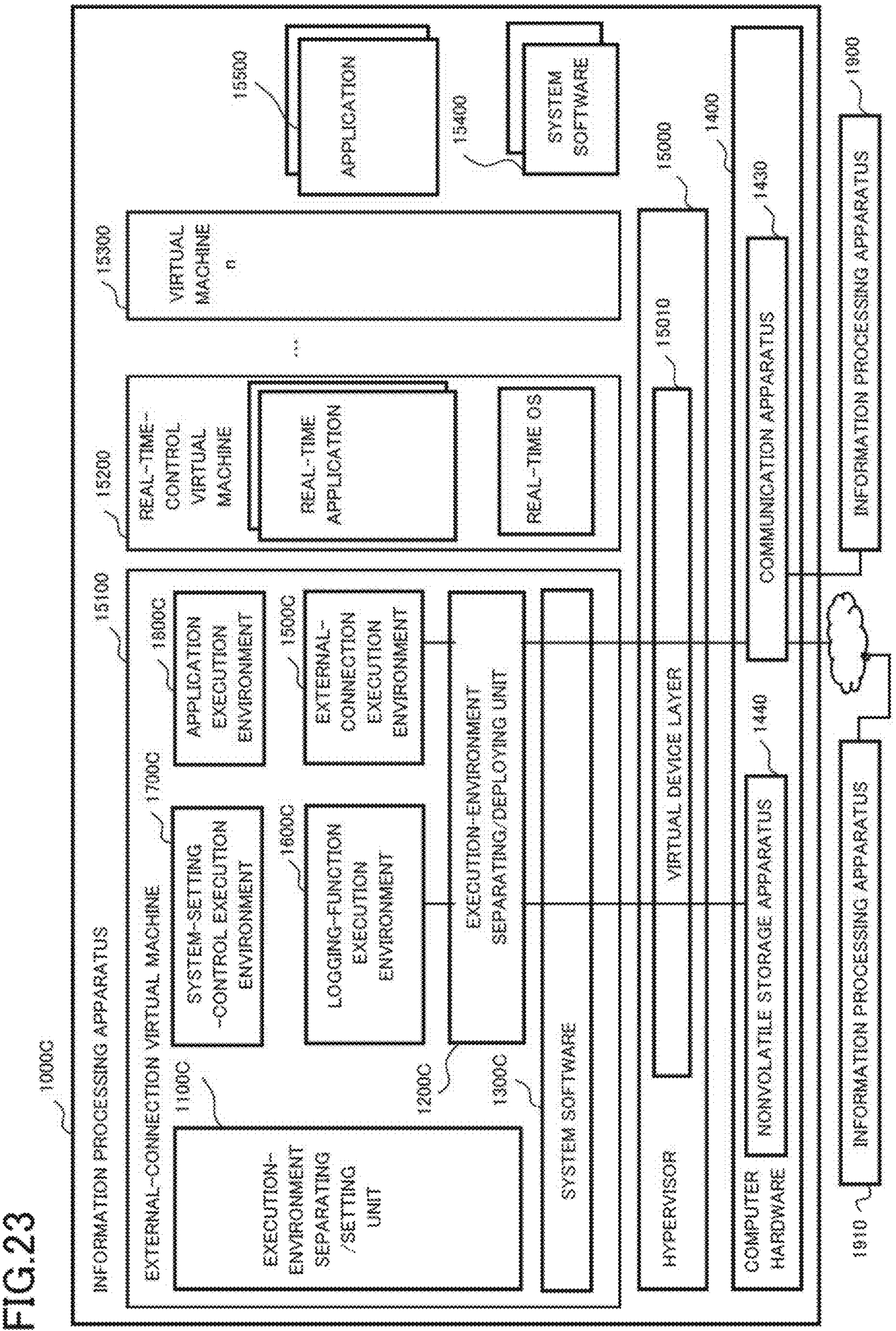
FIG. 23 is a block diagram representing the configuration of an information processing apparatus according to Embodiment 4.

FIG. 23 is a block diagram representing the configuration of an information processing apparatus 1000C according to Embodiment 4. The information processing apparatus 1000C is different from the information processing apparatus 1000 in FIG. 1 according to Embodiment 1 in that a hypervisor 15000 is provided on the computer hardware 1400 and a virtual device layer 15010 is provided in the hypervisor 15000 and in that virtual machines such as an external-connection virtual machine 15100, a real-time-control virtual machine 15200, and a virtual machine n 15300 are provided.

In the configuration of the information processing apparatus 1000C represented in FIG. 23, the hypervisor 15000 allocates virtual computer hardware items to the software items and execution environments (1100C, 1200C, 1300C, 1500C, 1600C, 1700C, and 1800C) in the external-connection virtual machine 15100. Accordingly, the function the same as that of the information processing apparatus 1000 represented in FIG. 1 according to Embodiment 1 can be implemented by the external-connection virtual machine 15100.

In addition, the information processing methods, related to the information processing apparatus 1000, explained heretofore may be utilized. Moreover, as explained heretofore, the external-connection virtual machine 15100 may be configured by use of the configuration apparatus 9000.

Although the present disclosure is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

The invention claimed is:

1. An information processing apparatus comprising:

computer hardware;

system software that manages and controls the computer hardware;

two or more application software items to be executed on the system software;

an execution-environment separator/setter comprising an execution-environment-separation definition table where setting items of respective execution environments in which the application software items are executed are defined, a configuration-risk definition table where a risk of being intruded from the outside is defined for each of the execution environments, a configuration-risk evaluator that calculates a risk value for each of the execution environments, based on the configuration-risk definition table, an activation-setter that performs setting and activation processing of the respective execution environments for the application software items; and an execution-environment separator/deployer that deploys the execution environment on the computer hardware, in accordance with an instruction of the activation-setter and based on setting of the execution environment defined by the execution-environment-separation definition table, wherein the application software is executed in the execution environment deployed by the execution-environment separator/deployer.

2. The information processing apparatus according to claim 1, wherein the activation-setter activates the application software deployed by the execution-environment separator/deployer, and cancels activation of the application software in the case where a risk value calculated by the configuration-risk evaluator is larger than a predetermined unacceptable value.

3. The information processing apparatus according to claim 1, wherein the activation-setter activates the application software items in accordance with an activation start sequence defined in the execution-environment-separation definition table.

4. The information processing apparatus according to claim 1, wherein the execution-environment separator/setter has the execution-environment-separation definition table in which there is defined setting of the execution environment of a logging function for recording processing contents of the information processing apparatus, wherein the execution-environment separator/deployer deploys, on the computer hardware, a logging-function execution environment in which a logging function is executed, based on separation information defined by the execution-environment-separation definition table, and wherein the logging function deployed by the execution-environment separator/deployer is executed.

5. The information processing apparatus according to claim 4, wherein the computer hardware has a communication apparatus and a nonvolatile storage apparatus, wherein the system software has a write-once circular buffer that enables additional writing and reading, wherein the execution-environment separator/setter has an execution-environment-separation definition table in which there is defined setting of an external-connection execution environment for connection with other information processing apparatuses through the communication apparatus, wherein the execution-environment separator/deployer deploys the external-connection execution environment on the computer hardware, based on separation information defined by the execution-environment-separation definition table, wherein a log outputted by a processing function in the external-connection execution environment is written in the write-once circular buffer, and wherein the logging function reads a communication log written in the write-once circular buffer and then records the communication log in the nonvolatile storage apparatus.

6. The information processing apparatus according to claim 4, wherein the execution-environment separator/setter performs setting of a logging-function execution environment in which a logging function is executed, for each of logging functions defined based on the logging-function-setting definition table.

7. The information processing apparatus according to claim 6, wherein the logging-function-setting definition table comprises a logging function name, logging-buffer setting that specifies a logging buffer to be allocated to the logging function and indicates a size of the logging buffer, a logging-buffer access function that indicates the execution environment in which the logging buffer is accessed and a function that operates in said execution environment, and logging-file setting that specifies a logging file in which contents of the logging buffer are recorded.

8. The information processing apparatus according to claim 6, wherein the execution-environment separator/setter has a state manager for managing a system state of the information processing apparatus and has a plurality of the execution-environment-separation definition tables, a plurality of logging-function-setting definition tables, and a plurality of configuration-risk definition tables that each correspond to a system state managed by the state manager.

9. The information processing apparatus according to claim 1, wherein the execution-environment-separation definition table comprises a name of the execution environment to be set, space separation setting indicating a space to be set, an execution-environment file system setting that indicates a file system to be utilized in the execution environment, a system-call permission list indicating system calls for each of which the system software is permitted to issue a function program that operates in the execution environment, a system-function permission list indicating functions, among functions of the system software, to be utilized in the execution environment, resource-allocation setting for indicating resources, among resources managed by the system software, to be allocated in the execution environment, and device-access-control setting for indicating a device that is managed by the system software and is accessed in the execution environment.

10. The information processing apparatus according to claim 1, wherein the configuration-risk definition table has a risk identifier that specifies a configuration risk, a risk definition indicating the execution environment having a configuration risk and a separation definition, and a risk value indicating a risk degree for the risk definition.

11. The information processing apparatus according to claim 10, wherein the risk definition of the configuration-risk definition table includes a logic evaluation equation utilizing the risk identifier and a summation evaluation equation based on a summation of risk values, and the risk value includes an expression indicating that the risk value is unacceptable, and wherein the configuration-risk definition table has a configuration-timing evaluation indicating that in the case where a risk-value summation calculated by the configuration-risk evaluator is smaller than a predetermined unacceptable value, a risk is acceptable and that in the case where the risk-value summation is the same as or larger than the predetermined unacceptable value, the risk is unacceptable.

12. The information processing apparatus according to claim 1, wherein the computer hardware has a diagnostic port connected with an external diagnosis apparatus, wherein the execution-environment separator/setter has an execution-environment-separation definition table in which there is defined setting of a diagnostic-connection execution environment for performing reception of a diagnosis request from the diagnosis apparatus, execution of a diagnostic test on the information processing apparatus, and transmission of a result of the diagnostic test to the diagnosis apparatus, and wherein the execution-environment separator/deployer deploys the diagnostic-connection execution environment on the computer hardware, based on separation information defined by the execution-environment-separation definition table.

13. An information processing method for the information processing apparatus according to claim 1, the information processing method comprising:

a first step where the activation-setter obtains a configuration-timing evaluation indicating whether or not a risk in the information processing apparatus is acceptable, based on the configuration-risk definition table;

a second step where when the configuration-timing evaluation is "acceptable", the activation-setter starts activation processing of the execution environment for each of the execution environments defined in the execution-environment-separation definition table and when the configuration-timing evaluation is "inappropriate", the processing by the activation-setter is ended;

a third step where the activation-setter waits for whether or not a result of activation processing of the execution environment for each of the execution environments is good; and a fourth step where when the result of activation processing of the execution environment is good and there exists the execution environment, among the execution environments defined in the execution-environment-separation definition table, to which activation processing has not been applied, the activation-setter starts activation processing of said execution environment and then advances to the third step, when the result of activation processing is good and there exists none of the execution environments to each of which activation processing has not been applied, the activation-setter ends the processing, and when the result of activation processing is bad, the activation-setter ends all the execution environments to each of which activation processing has been applied.

14. The information processing method according to claim 13, the information processing method comprising, before the first step:

a fifth step where for each of risk identifiers specified in the configuration-risk definition table, the configuration-risk evaluator determines whether or not contents that coincide with any of the execution environments and any of the separation definitions described in the risk definitions exist in the execution-environment-separation definition table or whether or not any description of a risk evaluation equation or a risk-value sum exists in the risk definition;

a sixth step where when neither contents that coincide with any of the execution environments and any of the separation definitions described in the risk definitions for the risk identifiers exist in the execution-environment-separation definition table nor any description of the risk evaluation equation or the risk-value sum exists in the risk definition, the fifth step is performed for a next risk identifier and where when contents that coincide with any of the execution environments and any of the separation definitions for each of the risk identifiers specified in the configuration-risk definition table exist in the execution-environment-separation definition table or any description of the risk evaluation equation or the risk-value sum exists, the configuration-risk evaluator obtains a risk value described in a risk-value section for each of the risk identifiers specified in the configuration-risk definition table;

a seventh step where in the case where the obtained risk value is unacceptable, the configuration-risk evaluator records "inappropriate" in the configuration-timing evaluation specified in the configuration-risk definition table;

an eighth step where in the case where the obtained risk value is acceptable and a risk identifier related to the risk value is not a last risk identifier specified in the configuration-risk definition table, the configuration-risk evaluator adds the obtained risk value to a risk-value summation and then performs the fifth step; and a ninth step where in the case where the obtained risk value is acceptable and a risk identifier related to the risk value is a last risk identifier specified in the configuration-risk definition table, the configuration-risk evaluator records "acceptable" in the configuration-timing evaluation specified in the configuration-risk definition table.

15. An information processing method for the information processing apparatus according to claim 1, the information processing method comprising:

a first step where the activation-setter obtains a configuration-timing evaluation indicating whether or not a risk in the information processing apparatus is acceptable, based on the configuration-risk definition table;

a second step where when the configuration-timing evaluation is “acceptable”, the activation-setter advances to a next step of processing of the execution environment by the activation-setter and when the configuration-timing evaluation is “inappropriate”, the processing by the activation-setter is ended;

a third step where the activation-setter creates an execution-environment activation process that performs activation processing of the execution environment, and in the case where an error occurs, while the execution-environment activation process performs activation processing of the execution environment, the activation-setter notifies an error-result, ends the activated execution environment, and then ends processing by the activation-setter;

a fourth step where the execution-environment activation process creates an initial process of activation processing of the execution environment;

a fifth step where based on a description of space separation setting for the initial process, specified in the execution-environment-separation definition table, the execution-environment activation process instructs the execution-environment separator/deployer to deploy the execution environment through a space separator of the system software;

a sixth step where based on a root file system described in an execution-environment file system setting specified by the execution-environment-separation definition table, the execution-environment activation process specifies the root file system to be utilized in the execution environment;

a seventh step where based on a sharing file system path described in the execution-environment file system setting specified by the execution-environment-separation definition table, the execution-environment activation process specifies the sharing file system path to be utilized in the execution environment;

an eighth step where based on a description of device-access-control setting specified by the execution-environment-separation definition table, the execution-environment activation process allocates devices to be utilized in the execution environment and enables only a specified access method;

a ninth step where the execution-environment activation process starts activation processing of a functional process of the execution environment from the initial process of the execution environment and performs initial setting of the functional process;

a tenth step where the execution-environment activation process waits for completion of initial setting of the functional process of the execution environment;

an eleventh step where based on a description in a system-call permission list specified by the execution-environment-separation definition table through a system call control unit of the system software, the execution-environment activation process confines a system call callable from the execution environment;

a twelfth step where based on a description in a system-function permission list specified by the execution-environment-separation definition table through a system function control unit of the system software, the execution-environment activation process confines a function, of the system software, that can be utilized by the execution environment;

a thirteenth step where based on a description of resource-allocation setting specified by the execution-environment-separation definition table through a hard resource control unit of the system software, the execution-environment activation process confines a resource, of the computer hardware, that can be utilized by the execution environment;

a fourteenth step where in the case where the execution environment is a logging-function execution environment, the execution-environment activation process performs logging-function setting processing;

a fifteenth step where in the case where in the functional process in the execution environment, there exists a function that accesses to a log, the execution-environment activation process determines whether or not the logging-function execution environment has been activated and where when the logging-function execution environment has not been activated, the execution-environment activation process notifies an error-result and then ends the activated execution environment; and a sixteenth step where the execution-environment activation process starts after-initial-setting processing of the functional process in the execution environment and completes activation of the functional process.

16. The information processing method according to claim 15, wherein the execution-environment separator/setter has a logging-function-setting definition table, wherein the fourteenth step comprises a seventeenth step where for each of logging functions, described in logging function names, that are specified in the logging-function-setting definition table, the activation-setter creates a write-once circular buffer with a size described in logging-buffer setting;

an eighteenth step where for each of environments, described in the logging-buffer access function, that are specified in the logging-function-setting definition table, the activation-setter installs a writing interface for the write-once circular buffer;

a nineteenth step where for each of functions, described in the logging-buffer access function, that are specified in the logging-function-setting definition table, the activation-setter sets permission of writing in the write-once circular buffer; and a twentieth step where the activation-setter creates, as a file to be recorded and stored, a logging file, described in a logging-file setting, that is specified in the logging-function-setting definition table, and wherein the sixteenth step comprises a twenty-first step where for performing processing of reading logging data from the write-once circular buffer and processing of recording the logging data in the write-once circular buffer, the activation-setter sets the logging function in a waiting state, until the logging data is written in the write-once circular buffer.

17. The information processing apparatus according to claim 1, wherein the computer hardware has a communication apparatus, wherein the execution-environment separator/setter has an execution-environment-separation definition table in which there is defined setting of a system-setting-control execution environment where there function an authentication/secure accessor that performs authentication processing and secure communication processing for receiving system-setting control information, from an external configuration apparatus through the communication apparatus, that is for setting at least one of the system software and the application software, and a system-setting-control processor that sets and executes at least one of the system software and the application software, based on the received system-setting control information, and wherein the execution-environment separator/deployer deploys the system-setting-control execution environment on the computer hardware, based on separation information defined by the execution-environment-separation definition table.

18. A configuration apparatus to be connected with the information processing apparatus according to claim 17, the configuration apparatus comprising:

an HMI having an input circuit and a display;

an execution-environment-separation definition table for transmission;

a logging-function-setting definition table for transmission;

a configuration-risk definition table for transmission;

a configuration-risk evaluator for transmission;

a system-setting-control instruction description in which there is described processing to be executed by the system-setting-control processor in the system-setting-control execution environment provided in the information processing apparatus;

an authentication/secure accessor for transmission that performs authentication processing and secure communication processing between itself and the system-setting-control execution environment provided in the information processing apparatus; and a deployer that transmits, to the system-setting-control execution environment of the information processing apparatus, information including the execution-environment-separation definition table for transmission, the logging-function-setting definition table for transmission, the configuration-risk definition table for transmission, and the system-setting-control instruction description.

19. A configuration method for the configuration apparatus according to claim 18, the configuration method comprising:

a first step where the deployer makes the configuration-risk evaluator for transmission calculate a risk value based on a configuration-risk definition table for transmission;

a second step where the deployer obtains a configuration-timing evaluation in the configuration-risk definition table for transmission;

a third step where in the case where the configuration-timing evaluation is acceptable, the deployer configures a secure interconnection path between the authentication/secure accessor for transmission of the configuration apparatus and the authentication/secure accessor of the information processing apparatus; and a fourth step where the deployer that transmits, to the information processing apparatus, data including the execution-environment-separation definition table for transmission, the logging-function-setting definition table for transmission, the configuration-risk definition table for transmission, and the system-setting-control instruction description.

20. An information processing method for the information processing apparatus according to claim 8, the information processing method comprising:

a first step where in the case where the state manager determines that state transition has occurred in a system state of the information processing apparatus and a second configuration-risk definition table for a system state after the state transition exists, there is extracted, for each of execution environments, an execution environment in which there exists a difference between respective setting contents in a first execution-environment-separation definition table for a system state before the state transition and a second execution-environment-separation definition table for a system state after the state transition;

a second step where the state manager performs ending processing of the extracted execution environment in which a difference exists between setting contents;

a third step where the state manager extracts, for each of logging function names, a logging function in which there exists a difference between respective setting contents in a first logging-function-setting definition table for a system state before the state transition and a second logging-function-setting definition table for a system state after the state transition;

a fourth step where the state manager performs ending processing of the extracted logging function in which a difference exists between setting contents;

a fifth step where the state manager discards an access permission, described in a logging-buffer access function specified in the logging-function-setting definition table, of the extracted logging function in which a difference exists between setting contents;

a sixth step where the state manager discards an interface for a write-once circular buffer, described in the logging-buffer access function specified in the logging-function-setting definition table, of the extracted logging function in which a difference exists between setting contents;

a seventh step where the state manager performs ending processing of the write-once circular buffer, described in logging-buffer setting specified in the logging-function-setting definition table, of the extracted logging function in which a difference exists between setting contents;

an eighth step where the activation-setter performs setting-and-activation processing of the extracted execution environment in which a difference exists between setting contents; and a ninth step where the activation-setter performs logging-function setting of the extracted logging function in which a difference exists between setting contents.

* * * * *